United States Patent
Otoshi et al.

(10) Patent No.: US 7,828,997 B2
(45) Date of Patent: Nov. 9, 2010

(54) METHOD FOR PRODUCING CELLULOSE ACYLATE FILM

(75) Inventors: Masaaki Otoshi, Fujinomiya (JP); Kiyokazu Hashimoto, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 747 days.

(21) Appl. No.: 11/442,541

(22) Filed: May 30, 2006

(65) Prior Publication Data

US 2006/0270292 A1 Nov. 30, 2006

(30) Foreign Application Priority Data

May 30, 2005 (JP) .............................. 2005-157811

(51) Int. Cl.
*B29C 41/52* (2006.01)
*B29C 47/92* (2006.01)
*B29D 11/00* (2006.01)

(52) U.S. Cl. ...................... 264/40.6; 264/1.31; 264/2.7; 264/211.21; 264/217; 264/290.2

(58) Field of Classification Search ................ 264/40.6, 264/201.1, 211.1, 217, 216, 1.1, 1.31, 2.7, 264/211.21, 288.4, 290.2
See application file for complete search history.

(56) References Cited

U.S. PATENT DOCUMENTS

2003/0031848 A1\* 2/2003 Sawada et al. .............. 428/220
2005/0150426 A1\* 7/2005 Hashimoto et al. ..... 106/170.21

FOREIGN PATENT DOCUMENTS

| JP | 2000-352620 | \* 12/1980 |
| JP | 2002-311240 A | 10/2002 |
| JP | 2003-315551 A | 11/2003 |

\* cited by examiner

*Primary Examiner*—Mathieu D. Vargot
(74) *Attorney, Agent, or Firm*—Sughrue Mion, PLLC

(57) ABSTRACT

According to the present invention, a cellulose acylate film difficult to be broken even if the stretching ratio is increased upon stretching and whose retardation (Re) is easily controllable to a desired value can be produced by melt film forming. Accordingly, a stretched cellulose acylate film highly oriented and having an appropriate retardation (Re) required from liquid crystal display device manufacturers can be produced.

6 Claims, 5 Drawing Sheets

FIG.4

| | Example 1 | Example 2 | Example 3 | Example 4 | Example 5 | Comparative Example 1 | Comparative Example 2 | Example 6 | Example 7 | Example 8 | Example 9 | Example 10 |
|---|---|---|---|---|---|---|---|---|---|---|---|---|
| YI VALUE | 6 | 6 | 7 | 4 | 6 | 4 | 13 | 3 | 9 | 4 | 2 | 5 |
| HAZE (%) | 0.8 | 0.4 | 0.5 | 0.7 | 1.2 | 2.6 | 0.7 | 1.8 | 0.2 | 0.7 | 0.4 | 0.6 |
| DISTRIBUTION | 5.6 | 0.5 | 1.3 | 4.4 | 4.7 | 12.2 | 1.1 | 1.4 | 2.2 | 4.4 | 4.4 | 4.4 |
| UNSTRETCHED FILM Re (nm) | 80 | 0 | -5 | 60 | 75 | 90 | -11 | 80 | 30 | 80 | 60 | 60 |
| THICKNESS (μm) | 148 | 147 | 153 | 150 | 155 | 160 | 150 | 144 | 143 | 150 | 133 | 155 |
| DISTANCE BETWEEN DIE AND COOLING DRUM (mm) | 50 | 50 | 50 | 50 | 50 | 50 | 50 | 50 | 50 | 220 | 50 | 50 |
| ELONGATION AT STRETCHING BREAK (%) | 70 | 280 | 300 | 100 | 53 | 35 | 270 | 70 | 220 | 100 | 195 | 210 |
| D/W | 5.1 | 5.1 | 4.9 | 5.0 | 4.8 | 4.7 | 5.0 | 5.2 | 5.2 | 5.0 | 1.5 | 10.0 |
| DIE LIP CLEARANCE (μm) | 750 | 750 | 750 | 750 | 750 | 750 | 750 | 750 | 750 | 750 | 200 | 1550 |
| DIE OUTLET RESIN TEMPERATURE (°C) | +90 | +120 | +135 | +105 | +100 | +68 | +160 | +105 | +105 | +105 | +105 | +105 |
| EXTRUDER OUTLET RESIN TEMPERATURE (°C) | 210 | 210 | 210 | 210 | 210 | 210 | 210 | 185 | 245 | 210 | 210 | 210 |
| L/D | 30 | 30 | 30 | 30 | 30 | 30 | 30 | 30 | 30 | 30 | 30 | 30 |
| EXTRUDER COMPRESSION RATIO | 3.5 | 3.5 | 3.5 | 3.5 | 3.5 | 3.5 | 3.5 | 3.5 | 3.5 | 3.5 | 3.5 | 3.5 |
| TG (°C) | 125 | 125 | 125 | 125 | 125 | 125 | 125 | 125 | 125 | 125 | 125 | 125 |
| MOLECULAR WEIGHT | 50000 | 50000 | 50000 | 50000 | 50000 | 50000 | 50000 | 50000 | 50000 | 50000 | 50000 | 50000 |
| CELLULOSE ACYLATE SUBSTITUTION DEGREE — X+Y | 2.7 | 2.7 | 2.7 | 2.7 | 2.7 | 2.7 | 2.7 | 2.7 | 2.7 | 2.7 | 2.7 | 2.7 |
| CELLULOSE ACYLATE SUBSTITUTION DEGREE — Y (SUM OF Y1 TO 4) | 1.7 | 1.7 | 1.7 | 1.7 | 1.7 | 1.7 | 1.7 | 1.7 | 1.7 | 1.7 | 1.7 | 1.7 |
| CELLULOSE ACYLATE SUBSTITUTION DEGREE — BUTYRYL GROUP (Y2) | 1.7 | 1.7 | 1.7 | 1.7 | 1.7 | 1.7 | 1.7 | 1.7 | 1.7 | 1.7 | 1.7 | 1.7 |
| CELLULOSE ACYLATE SUBSTITUTION DEGREE — PROPIONATE GROUP (Y1) | - | - | - | - | - | - | - | - | - | - | - | - |
| CELLULOSE ACYLATE SUBSTITUTION DEGREE — ACETATE GROUP (X) | 1.0 | 1.0 | 1.0 | 1.0 | 1.0 | 1.0 | 1.0 | 1.0 | 1.0 | 1.0 | 1.0 | 1.0 |

FIG.5

| | | EXAMPLE1 | EXAMPLE2 | EXAMPLE3 | EXAMPLE4 | EXAMPLE5 | EXAMPLE6 | EXAMPLE7 | EXAMPLE8 | EXAMPLE9 | EXAMPLE10 | EXAMPLE11 | EXAMPLE12 |
|---|---|---|---|---|---|---|---|---|---|---|---|---|---|
| CELLULOSE ACYLATE | X ACETYL SUBSTITUTION DEGREE | 0.11 | 0.20 | 0.25 | 0.40 | 0.70 | 1.10 | 1.80 | 0.05 | 0.20 | 0.10 | 0.20 | 1.10 |
| | Y SUBSTITUTION DEGREE OF GROUPS OTHER THAN ACETYL | 2.81 | 2.60 | 2.53 | 2.30 | 1.90 | 1.40 | 1.05 | 2.90 | 2.00 | 1.95 | 2.60 | 1.72 |
| | SUBSTITUENT OTHER THAN ACETYL | PROPIONYL | PROPIONYL | PROPIONYL | PROPIONYL | PROPIONYL | PROPIONYL | PROPIONYL | PROPIONYL | PROPIONYL | PROPIONYL | BUTYRYL | BUTYRYL |
| | X+Y TOTAL SUBSTITUTION DEGREE | 2.92 | 2.80 | 2.78 | 2.70 | 2.60 | 2.50 | 2.85 | 2.95 | 2.20 | 2.05 | 2.80 | 2.82 |
| | POLYMERIZATION DEGREE | 190 | 200 | 210 | 170 | 185 | 195 | 160 | 170 | 140 | 150 | 200 | 180 |
| PLASTICIZER | KIND | PLASTICIZER4 | PLASTICIZER4 | PLASTICIZER4 | PLASTICIZER3 | PLASTICIZER3 | PLASTICIZER3 | PLASTICIZER1 | NONE | PLASTICIZER2 | PLASTICIZER4 | PLASTICIZER4 | PLASTICIZER4 |
| | AMOUNT | 6.0 | 8.0 | 10.0 | 6.0 | 9.0 | 12.0 | 6.0 | 0.0 | 15.0 | 20.0 | 8.0 | 6.0 |
| UNSTRETCHED FILM | THICKNESS ($\mu$m) | 110 | 80 | 90 | 110 | 95 | 125 | 85 | 75 | 75 | 140 | 80 | 85 |
| | Re (nm) | 3 | 0 | 1 | 5 | 8 | 8 | 10 | 6 | 3 | 2 | 9 | 8 |
| | Rth (nm) | 20 | 8 | 16 | 30 | 42 | 58 | 60 | 28 | 41 | 18 | 59 | 55 |
| | POLARIZING PLATE LAYER STRUCTURE | POLARIZING PLATE A | POLARIZING PLATE A | POLARIZING PLATE B | POLARIZING PLATE B | POLARIZING PLATE A | POLARIZING PLATE A | POLARIZING PLATE A | POLARIZING PLATE A | POLARIZING PLATE B | POLARIZING PLATE B | POLARIZING PLATE A | POLARIZING PLATE A |
| OTHER PHYSICAL PROPERTIES | POLARIZING PLATE COLOR TONE VARIATION* | 1 | 0 | 0 | 1 | 2 | 2 | 6 | 2 | 1 | 3 | 4 | 5 |
| | EVALUATION | ○ | ○ | ○ | ○ | ○ | ○ | △ | ○ | ○ | ○ | △ | △ |

PLASTICIZER 1: BIPHENYL DIPHENYLPHOSPHITE
PLASTICIZER 2: DIOCTYLADIPATE
PLASTICIZER 3: GLYCERIN DIACETATE MONOOLEATE
PLASTICIZER 4: POLYETHYLENE GLYCOL (MOLECULAR WEIGHT OF 600)
POLARIZING PLATE COLOR TONE VARIATION*: THE MAGNITUDE OF COLOR TONE VARIATION EVALUATED OVER 10 LEVELS (THE HIGHER THE LEVEL THE GREATER THE COLOR TONE VARIATION.)

METHOD FOR PRODUCING CELLULOSE ACYLATE FILM

This is a non-provisional application which claims priority from Japanese patent application 2005-157811 filed on May 30, 2006, which is incorporated herein by reference.

BACKGROUND OF THE INVENTION

1. Field of the Invention

The present invention relates to a cellulose acylate film, a stretched cellulose acylate film, and a method and an apparatus for producing the same, particularly to a technique for producing a cellulose acylate film before stretching for a stretched cellulose acylate film having qualities suitable for liquid crystal display devices by melt film forming.

2. Description of the Related Art

Conventionally, it has been attempted to enlarge viewing angles by stretching a cellulose acylate film for exhibiting in-plane retardation (Re) and retardation (Rth) in the thickness direction and using the film as a retardation film in liquid crystal display devices.

Methods of stretching such a cellulose acylate film include a method of stretching a film longitudinally (in the lengthwise direction)(longitudinal stretching), a method of stretching a film transversely (in the width direction)(transverse stretching), and a method of performing longitudinal stretching and transverse stretching simultaneously (simultaneous stretching). Of these, longitudinal stretching has been often employed because of the compactness of the equipment. In longitudinal stretching, a film is generally heated to its glass transition temperature (Tg) or higher on at least two pairs of nip rolls and stretched in the lengthwise direction with setting the carrying rate of the nip roll on the exit side faster than that of the nip roll on the entrance side.

Japanese Patent Application Laid-Open No. 2002-311240 describes a method of longitudinal stretching of cellulose ester. In Japanese Patent Application Laid-Open No. 2002-311240, angle irregularities in the slow axis are improved by performing longitudinal stretching in a direction opposite to the film casting direction. Japanese Patent Application Laid-Open No. 2003-315551 describes a method of stretching with nip rolls disposed in a stretching zone at a small span of a length/width ratio (L/W) of 0.3 to 2. In Japanese Patent Application Laid-Open No. 2003-315551, orientation in the thickness direction (Rth) can be improved. The length/width ratio described herein means a value obtained by dividing the distance (L) between the nip rolls used for stretching by the width (W) of a cellulose acylate film to be stretched.

SUMMARY OF THE INVENTION

However, when stretched cellulose acylate films obtained by the methods described in Japanese Patent Application Laid-Open Nos. 2002-311240 and 2003-315551 are used as a retardation film for a liquid crystal display device, minute display irregularities may be generated and so the films have a problem that their quality is unsatisfactory for a retardation film for a liquid crystal display device.

To improve quality of a retardation film for a liquid crystal display device, it is necessary to produce a highly oriented stretched cellulose acylate film by increasing the stretching ratio.

However, conventional cellulose acylate films produced by melt film forming have a problem that, in some production lot, the stretching ratio cannot be increased in the step of producing a stretched cellulose acylate film and they tend to be broken upon stretching.

Also, different liquid crystal display device manufacturers require different retardations (Re) for cellulose acylate films used as a retardation film. Therefore, another important property of a cellulose acylate film before stretching is to be able to accurately control retardation (Re) of a stretched cellulose acylate film to a desired value by stretching in the stretching step.

The present invention has been made in view of such circumstances and aims at providing a cellulose acylate film from which a stretched cellulose acylate film highly oriented and having an appropriate retardation (Re) required from liquid crystal display device manufacturers can be produced since a cellulose acylate film difficult to be broken even if the stretching ratio is increased upon stretching and easily controllable to a desired retardation (Re) can be prepared by melt film forming. The present invention also aims at providing a stretched cellulose acylate film and a method and an apparatus for producing the same.

To achieve the aforementioned object, a first aspect of the present invention provides a method for producing a cellulose acylate film by melt film forming, including discharging a molten resin melted in an extruder on a running or rotating cooling support through a die in a form of a sheet, thereby solidifying the discharged molten resin by cooling, the method comprising: measuring a retardation (Re) in a case where a lengthwise direction of the cellulose acylate film corresponds to the slow axis; and controlling the temperature of the molten resin at an outlet of the die so that the measured retardation falls into the range of −10 nm to 80 nm.

The present inventors have intensively studied why the stretching ratio of a cellulose acylate film produced by melt film forming cannot be increased and easily breakable films are produced in some production lot. As a result, it has been found that action similar to stretching takes place in the step of forming a cellulose acylate film by melt film forming, and if the stretching action is too great in that step, the stretching ratio cannot be increased in the main stretching step and films are easily breakable.

It has also been found that too much stretching in a film forming step makes it difficult to accurately control the retardation (Re) to a desired value in the main stretching step. This is because, since the stretching ratio of a non-stretched cellulose acylate film which has not undergone stretching is determined in the stretching step, if the stretching action in the film forming step is great, the retardation (Re) of a stretched cellulose acylate film produced by stretching in the stretching step is not as determined by the stretching ratio.

Such stretching action in the melt film forming step is greatly influenced by the temperature of the molten resin at the die outlet. This is because the stretching action takes place when a molten resin which has landed on a cooling support through a die is suddenly stretched by the running or rotation of the cooling support, and when the temperature at the outlet of the die is too low, the stretching action becomes great.

In dealing with this, the present inventors have found that when the stretching action produces a retardation (Re) in the case where the lengthwise direction of the formed cellulose acylate film corresponds to the slow axis of about −10 nm to 80 nm, the stretching ratio can be increased in the main stretching step and a cellulose acylate film difficult to be broken can be produced. They have also found that when the retardation (Re) is about −10 nm to 80 nm, the retardation (Re) can be accurately controlled to a desired value in the main stretching step.

Simple reference to a "cellulose acylate film" means a cellulose acylate film before stretching which has not yet stretched in the main stretching step, while a cellulose acylate film after being stretched in the stretching step is referred to as a "stretched cellulose acylate film".

According to the first aspect of the present invention, the retardation (Re) in the case where the lengthwise direction in a cellulose acylate film corresponds to the slow axis is measured and the temperature of a molten resin at an outlet of the die is controlled so that the measured retardation falls into the range of −10 nm to 80 nm. With this, a cellulose acylate film difficult to be broken even if the stretching ratio is increased when a formed cellulose acylate film before stretching is stretched in the stretching step and whose retardation (Re) is easily controllable to a desired value can be produced by melt film forming. Accordingly, a stretched cellulose acylate film highly oriented and having an appropriate retardation (Re) required from liquid crystal display device manufacturers can be produced.

In the present invention, when the solution film forming step involves no stretching action at all, i.e., when the retardation (Re) is 0 nm (zero), the film has a retardation (Re) that matches the stretching ratio determined in the stretching step, and therefore the retardation (Re) of the stretched cellulose acylate film can be easily controlled. However, since it is difficult to produce a cellulose acylate film whose retardation (Re) is 0 nm, the retardation (Re) may be in the range of −10 nm to 80 nm, preferably 0 nm to 50 nm, particularly preferably 0 nm to 30 nm.

A second aspect of the present invention has a feature that, in the first aspect, a lip clearance ratio (D/W) which is a ratio of a lip clearance (D) of the die to a thickness (W) of the molten resin discharged through the die is controlled in addition to controlling the temperature at the die outlet.

As described above, the stretching action in the melt film forming step is greatly influenced by the temperature of the molten resin at the die outlet, but is also influenced by the lip clearance ratio (D/W). In other words, the lip clearance ratio indicates how much a sheet-shaped molten resin is stretched by a running or rotating cooling support when the molten resin lands on the cooling support through a die. The greater the lip clearance ratio, the higher the stretching degree and the greater stretching action the film receives. Accordingly, by controlling the temperature of the molten resin at the die outlet and the lip clearance ratio, the retardation (Re) can be more precisely controlled so as to reach the ideal value 0 nm (zero).

To achieve the aforementioned object, a third aspect of the present invention provides a method for producing a cellulose acylate film by melt film forming, including discharging a molten resin melted in an extruder on a running or rotating cooling support through a die in a form of a sheet, thereby solidifying the discharged molten resin by cooling, the method comprising: controlling the temperature of the molten resin at an outlet of the die to a glass transition temperature (Tg)+70° C. to Tg +150° C.; and controlling a lip clearance ratio (D/W) which is a ratio of a lip clearance (D) of the die to a thickness (W) of the molten resin extruded through the die to a range of 1.5 to 10.

In the third aspect, the temperature of the molten resin at the die outlet is controlled to the glass transition temperature (Tg)+70° C. to Tg +150° C. and the lip clearance ratio is controlled to the range of 1.5 to 10 so that the retardation (Re) in the case where the lengthwise direction of the cellulose acylate film corresponds to the slow axis falls into the range of −10 nm to 80 nm.

By controlling as described above, a cellulose acylate film difficult to be broken even if the stretching ratio is increased when a formed cellulose acylate film before stretching is stretched in the main stretching step and whose retardation (Re) is easily controllable to a desired value can be produced by melt film forming. In this case, when the temperature of the molten resin at the die outlet is lower than glass transition temperature (Tg)+70° C., the advantage of the present invention cannot be obtained. When the temperature is higher than Tg +150° C., the cellulose acylate film is overheated and colored yellow.

A fourth aspect of the present invention has a feature that, in any one of the first to the third aspects, the extruder employs conditions of a screw compression ratio of 2.5 to 4.5, an L/D of 20 to 70, and a temperature of the molten resin at an outlet of the extruder of 190° C. to 240° C.

According to the fourth aspect, since the extruder employs conditions of a screw compression ratio of 2.5 to 4.5, an L/D of 20 to 70, and a temperature of the molten resin at the extruder outlet of 190° C. to 240° C., fine crystal hardly remain in the cellulose acylate film, and therefore a cellulose acylate film harder to be broken upon stretching in the stretching step can be produced. The upper limit of the temperature is set to 240° C. in order to reduce occurrence of yellowing.

A fifth aspect of the present invention has a feature that, in any of the first to fourth aspects, a distance for the molten resin discharged through the outlet of the die to land on the cooling support ranges from 5 mm to 200 mm.

By setting the distance for the molten resin extruded from the outlet of the die to land on the cooling support to the range of 5 mm to 200 mm, the distribution in the retardation (Re) in the width direction of the produced cellulose acylate film can be kept at 20 nm or lower. Further, when the distance is shorter than 5 mm, the molten resin discharged through the die is easily adhered to the tip of the die lip and causes contamination (so-called "resin contaminant"). Due to this contamination, die streaks tend to be formed on the cellulose acylate film to be produced. When the distance is longer than 200 mm, the cellulose acylate film to be produced has a narrow width due to necking.

The distribution in the retardation (Re) herein described refers to a difference between the maximum and the minimum of the retardation (Re).

To achieve the aforementioned object, a sixth aspect of the present invention provides a cellulose acylate film produced by melt film forming, satisfying the following property values: (a) a retardation (Re) in a case where a lengthwise direction of the film corresponds to a slow axis of −10 nm to 80 nm, (b) when X represents a degree of substitution by an acetyl group and Y represents a total degree of substitution by a propionyl group, a butyryl group, a pentanoyl group and a hexanoyl group, an acylate group having a following degree of substitution: $2.0 \leq X+Y \leq 3.0$, $0 \leq X \leq 2.0$, $1.2 \leq Y \leq 2.9$, and (c) a yellowness index (YI value) of 10 or less.

The sixth aspect defines property values of a cellulose acylate film suitably used as a functional film such as a retardation film in a liquid crystal display device. It is essential that the above requirements (a), (b) and (c) are satisfied. In this case, the retardation (Re) in the above (a) is in the range of preferably 0 nm to 50 nm, particularly preferably 0 nm to 30 nm.

A cellulose acylate film having such property values can be produced by the method for producing a cellulose acylate film of the present invention.

A seventh aspect of the present invention has a feature that, in the sixth aspect, the cellulose acylate film has a haze value of 2.0% or less.

When the haze value is higher than 2.0%, a larger amount of fine crystal remains in the produced cellulose acylate film and the film tends to be easily broken upon stretching in the main stretching step.

An eighth aspect of the present invention has a feature that, in the sixth or seventh aspect, the cellulose acylate film has an elongation at break of 50% or more when the film is uniaxially stretched at the glass transition temperature Tg +10° C.

The eighth aspect defines the elongation at break of a cellulose acylate film suitably used as a functional film such as a retardation film in a liquid crystal display device. It is essential that the cellulose acylate film has an elongation at break of 50% or more when the film is uniaxially stretched at the glass transition temperature Tg +10° C.

Herein, the elongation at break of 50% or more means that the film can be stretched by 50% or more before break based on the dimension before stretching. In other words, the film can be stretched by 1.5 times or higher when the length before stretching is defined as 1.

A cellulose acylate film having an elongation at break of 50% or more can be produced by the method for producing a cellulose acylate film of the present invention. The elongation at break can be measured by using a tensile tester equipped with a heater, e.g., "Strograph" made by Toyo Seiki Seisakusho, LTD., by pre-heating a film sample in an oven heated to Tg +10° C. of the film sample and then measuring the elongation at break (stretching difference before and after stretching) before break of the film sample under conditions of a chuck distance of 100 mm and a tensile speed of 100 mm/minute.

A ninth aspect of the present invention has a feature that, in any one of the sixth to eighth aspects, the cellulose acylate film has an unevenness in retardation (Re) in the width direction and the lengthwise direction of 20 nm or less.

The ninth aspect defines the unevenness in retardation (Re) of a cellulose acylate film suitably used as a functional film such as a retardation film in a liquid crystal display device. The unevenness in the width direction and the lengthwise direction is preferably 20 nm or less. To suppress the unevenness in retardation (Re) in the width direction, the distance for the molten resin extruded through the die outlet to land on the cooling support described in the fifth aspect is important. By setting the distance to 5 mm to 200 mm, an unevenness in retardation (Re) in the width direction of 20 nm or less can be obtained. To suppress the unevenness in retardation (Re) in the lengthwise direction, the temperature of the molten resin at the die outlet is important. By controlling the temperature of the molten resin at the die outlet to the glass transition temperature (Tg) +70° C. to Tg +150° C., an unevenness in retardation (Re) in the lengthwise direction of 20 nm or less can be obtained.

A tenth aspect has a feature that, in any one of the sixth to ninth aspects, the cellulose acylate film has a molecular weight of 20,000 to 100,000.

This is because when the molecular weight is larger than 100,000, the melt viscosity increases, thus the temperature at the extruder outlet increases, and yellowing tends to occur due to thermal degradation; and on the other hand, when the molecular weight is less than 20,000, the mechanical strength when formed into a film decreases.

To achieve the aforementioned object, an eleventh aspect of the present invention provides a method for producing a stretched cellulose acylate film, comprising stretching the cellulose acylate film before stretching produced according to any one of the first to fifth aspects in at least a lengthwise direction a the transverse direction of the film by 1% to 300%.

The eleventh aspect of the present invention is a method for producing a stretched cellulose acylate film obtained by stretching a cellulose acylate film produced by any method according to the first to the fifth aspects. Use of the cellulose acylate film of the present invention enables stretching of 1% to 300%. Accordingly, a stretched cellulose acylate film excellent as a functional film such as a retardation film in a liquid crystal display device can be obtained.

To achieve the aforementioned object, a twelfth aspect of the present invention provides a stretched cellulose acylate film, comprising stretching a cellulose acylate film before stretching according to any one of the sixth to tenth aspects in at least a lengthwise direction and a transverse direction of the film by 1% to 300%.

For the stretched cellulose acylate film according to the twelfth aspect of the present invention, stretching by 1% to 300% is possible by using a cellulose acylate film having any one of the property values of the sixth to the tenth aspects. Accordingly, a stretched cellulose acylate film excellent as a functional film such as a retardation film in a liquid crystal display device can be obtained.

A thirteenth aspect of the present invention has a feature that, in the twelfth aspect, the stretched cellulose acylate film has a thickness of 30 μm to 300 μm, an in-plane retardation (Re) of 0 nm to 500 nm, a retardation (Rth) in the thickness direction of 30 nm to 500 nm.

For the stretched cellulose acylate film according to the thirteenth aspect, stretching is performed in at least the lengthwise direction and the transverse direction by 1% to 300% to give a stretched cellulose acylate film suitably used as a functional film such as a retardation film in a liquid crystal display device, which has a thickness of 30 μm to 300 μm, an in-plane retardation (Re) of 0 nm to 500 nm, and a retardation (Rth) in the thickness direction of 30 nm to 500 nm.

A fourteenth aspect of the present invention has a feature that, in the thirteenth aspect, the stretched cellulose acylate film has a fluctuation in the Re and the Rth in the width direction and the lengthwise direction of 5% or less.

For the stretched cellulose acylate film according to the fourteenth aspect, stretching is performed using a cellulose acylate film having any one of the property values of the sixth to the tenth aspects. Accordingly, the fluctuation in the Re and the Rth in the width direction and the lengthwise direction can be kept as small as 5% or less.

A fifteenth aspect of the present invention is a polarizing plate comprising at least one cellulose acylate film according to any one of the sixth to tenth aspects being stacked. A sixteenth aspect of the present invention is an optical compensation film for a liquid crystal display board, comprising the cellulose acylate film according to any one of the sixth to tenth aspects as a substrate. A seventeenth aspect of the present invention is an anti-reflection film comprising the cellulose acylate film according to any one of the sixth to tenth aspects as a substrate. An eighteenth aspect of the present invention is a polarizing plate comprising at least one stretched cellulose acylate film according to any one of the twelfth to fourteenth aspects being stacked. A nineteenth aspect of the present invention is an optical compensation film for a liquid crystal display board, comprising the stretched cellulose acylate film according to any one of the twelfth to fourteenth aspects as a substrate. A twentieth aspect of the present invention is an anti-reflection film comprising the stretched cellulose acylate film according to any one of the twelfth to fourteenth aspects as a substrate.

To achieve the aforementioned object, a twenty-first aspect of the present invention provides an apparatus for producing a cellulose acylate film by melt film forming which discharges a molten resin melted in an extruder on a running or rotating cooling support through a die in a form of a sheet and solidifies the discharged molten resin by cooling, the apparatus comprising: a heater for heating at least an outlet of the die, a measuring device which measures a retardation (Re) in a case where a lengthwise direction of the cellulose acylate film corresponds to a slow axis, and a temperature control device which controls the heater so that the measured retardation falls into a range of −10 nm to 80 nm.

In the twenty-first aspect, the present invention is configured as an apparatus. The measuring device measures the retardation (Re) of the cellulose acylate film, and the temperature at the die outlet is controlled based on the measurement result. Herein, stretching action in the melt film forming step increases if the temperature of the molten resin at the die outlet is too low. Accordingly, although the heater generally warms up the die outlet by giving heat, it is preferred that the heater also has a function of cooling the die outlet because the formed cellulose acylate film is colored when the temperature of the molten resin is too high.

To achieve the aforementioned object, the twenty-second aspect of the present invention provides an apparatus for producing a cellulose acylate film by melt film forming in which a molten resin melted in an extruder is discharged on a running or rotating cooling support through a die in the form of a sheet and solidifies the discharged molten resin by cooling, the apparatus comprising: a heater for heating at least an outlet of the die, a temperature sensor which measures a temperature of the molten resin at the outlet of the die without contact, a temperature control device which controls the heater so that the temperature of the molten resin measured by the temperature sensor falls into a range of a glass transition temperature (Tg) of the molten resin +70° C. to Tg +150° C., and a speed control device which controls a running or rotating speed of the cooling support so that a lip clearance ratio (D/W) which is a ratio of a lip clearance (D) of the die to a thickness (W) of the molten resin extruded through the die falls into a range of 1.5 to 10.

In the twenty-second aspect, the present invention is configured as an apparatus. The temperature sensor measures the temperature of the molten resin at the die outlet and the temperature at the die outlet is controlled based on the measurement result. At the same time, the running or rotating speed of the cooling support is controlled. It is preferred that the heater has both the heating and cooling functions in this case as well.

According to the present invention, a cellulose acylate film difficult to be broken even if the stretching ratio is increased upon stretching and whose retardation (Re) is easily controllable to a desired value can be produced by melt film forming. Accordingly, a stretched cellulose acylate film highly oriented and having an appropriate retardation (Re) required from liquid crystal display device manufacturers can be produced.

BRIEF DESCRIPTION OF THE DRAWINGS

FIG. 4 is an explanatory diagram of an example according to the present invention; and FIG. 5 is an explanatory diagram of an example according to the present invention.

DETAILED DESCRIPTION OF THE PREFERRED EMBODIMENTS

Hereinafter, preferred embodiments of the cellulose acylate film, the stretched cellulose acylate film, and the method and the apparatus for producing the same of the present invention are described with reference to the attached drawings.

Figure 1:
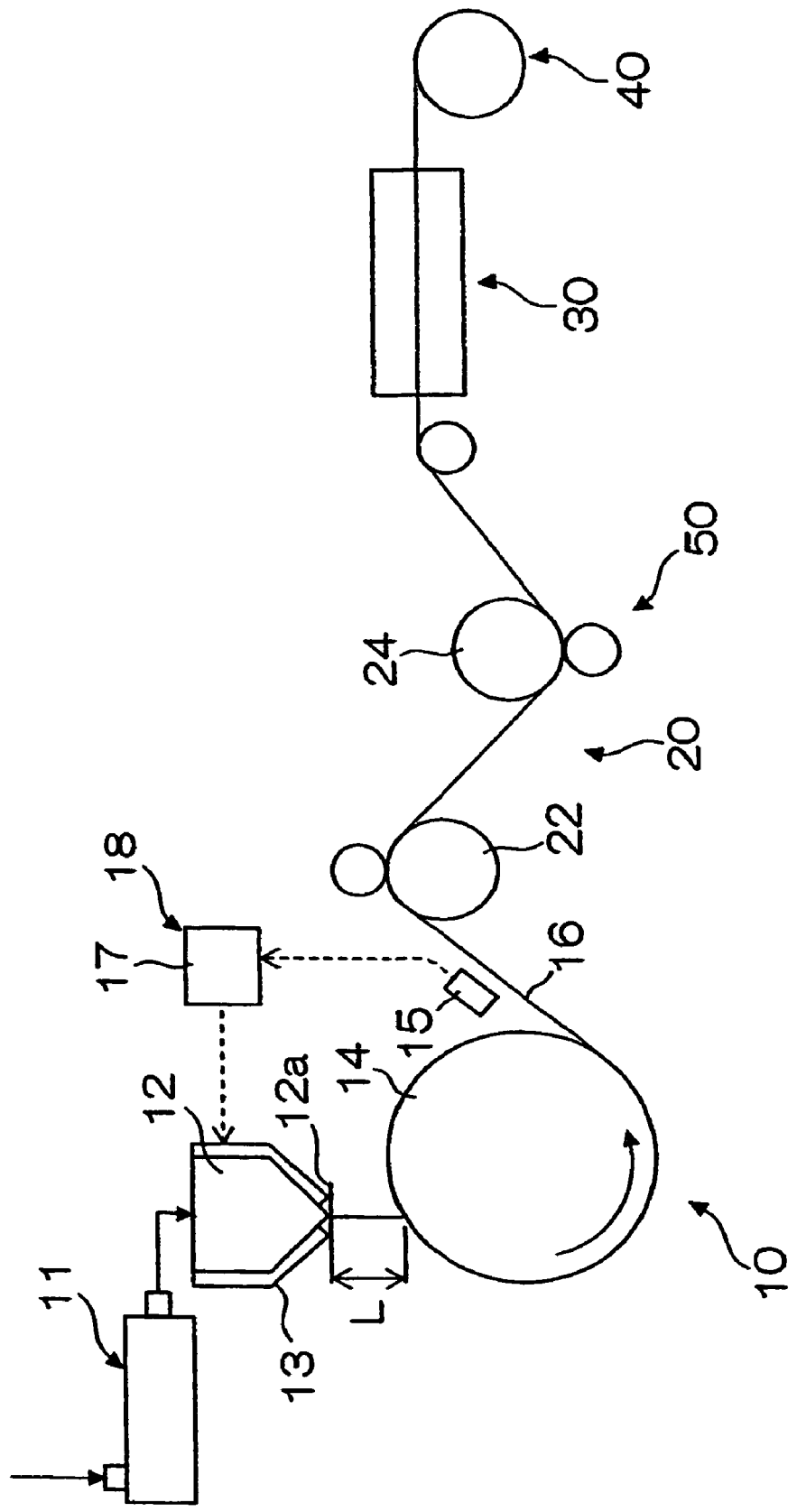
FIG. 1 is a structural diagram illustrating one embodiment of the production process having a Re control mechanism for the film production apparatus employed in the present invention.

FIG. 1 illustrates an example of schematic structures of an apparatus for producing a stretched cellulose acylate film.

As shown in FIG. 1, the apparatus mainly includes a film forming step 10 for producing a cellulose acylate film before stretching, a longitudinal stretching step 20 for longitudinally stretching the cellulose acylate film before stretching produced in the film forming step 10, a transverse stretching step 30 for transverse stretching, and a take-up step 40.

In the film forming step 10, a cellulose acylate resin melted in an extruder 11 (hereinafter "molten resin") is discharged through a die 12 in the form of a sheet and cast on a rotating cooling drum 14 (cooling support) to solidify the resin by rapid cooling. A cellulose acylate film 16 is formed by this mechanism. The cellulose acylate film 16 is released from the cooling drum 14 and transferred sequentially to the longitudinal stretching step 20 and the transverse stretching step 30 to be stretched in a stretching step 50. The film is then taken up as a roll in the take-up step 40. A stretched cellulose acylate film is produced by these steps.

A jacket 13 (heater) which controls the temperature of the molten resin in the die 12 (at least the die outlet) is put around the die 12. Also, a Re measuring device 15 which measures the retardation (Re) of the cellulose acylate film 16 released from the cooling drum 14 on-line is disposed near the release point of the cooling drum 14. The Re measuring device 15 constantly outputs measured values to a temperature control device 17. For the on-line measuring device 17 of the retardation (Re), for example, KOBRA-WID made by Oji Scientific Instruments may be used. The temperature control device 17 adjusts the temperature of the jacket 13 so that the measured value in the Re measuring device 15 ranges from −10 to 80 nm, thereby controlling the temperature of the molten resin at the die outlet 12a. This constitutes an Re suppressing mechanism 18 which suppresses the retardation (Re) of a cellulose acylate film generated in the film forming step 10 due to stretching action to the range of −10 to 80 nm. The jacket 13 may be electric or hot water type. While the jacket 13 generally warms up the die 12 by applying heat, it is preferred that the jacket 13 also has a function of cooling the die 12, because the formed cellulose acylate film 16 is colored when the temperature of the molten resin is too high.

Figure 2:
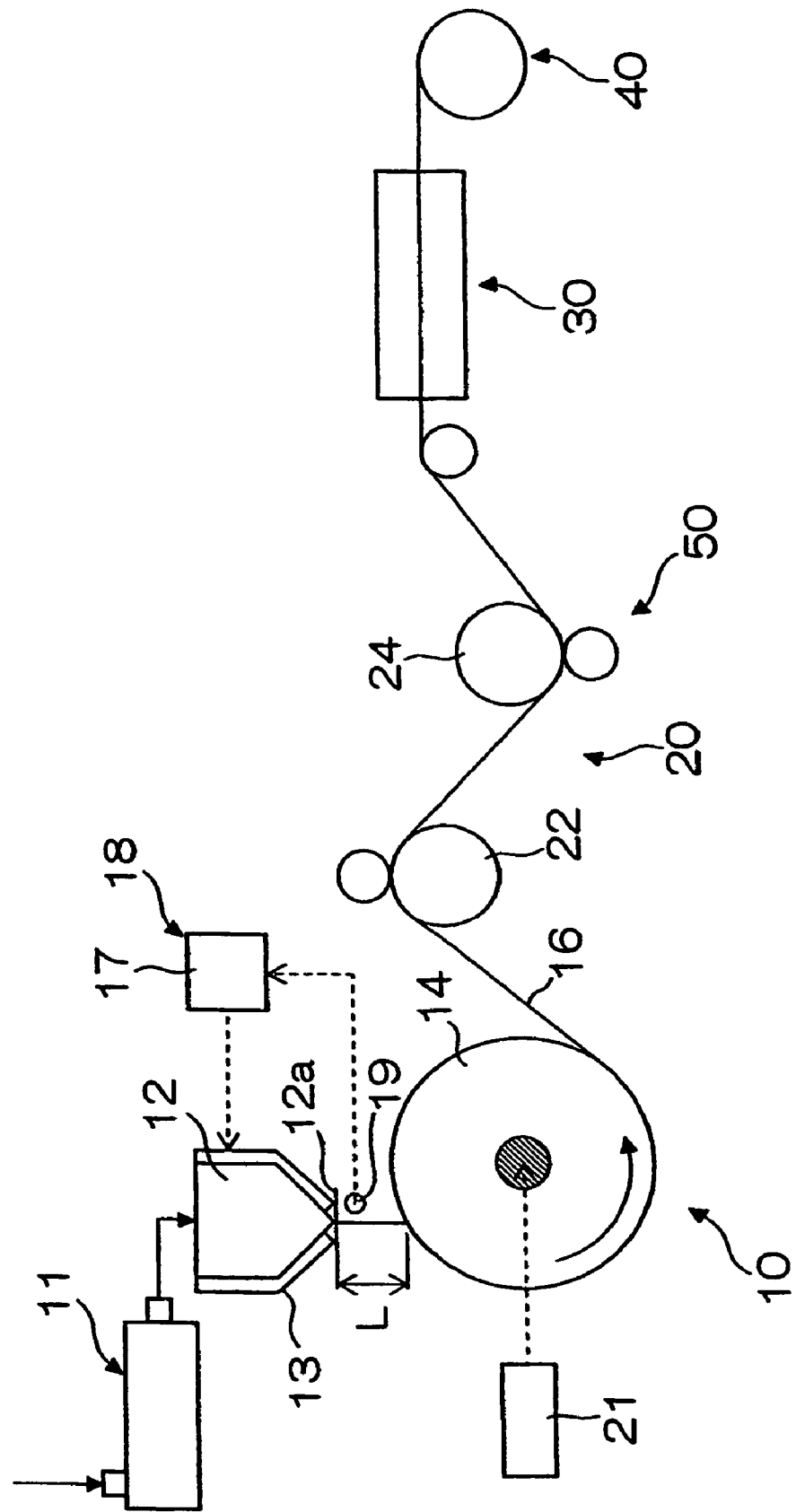
FIG. 2 is a structural diagram illustrating another embodiment of the production process having a Re control mechanism for the film production apparatus employed in the present invention.

FIG. 2 illustrates another embodiment of the Re suppressing mechanism 18. A jacket 13 which controls the temperature of the molten resin in the die 12 (at least the die outlet) is put around the die 12. A temperature sensor 19 which measures the temperature of the molten resin discharged through the die 12 without contact is also disposed near the outlet of the die 12. The temperature sensor 19 constantly outputs measured values to the temperature control device 17. A speed control device 21 which controls the rotational speed of the cooling drum 14 is also disposed. The temperature control device 17 controls the temperature of the jacket 13 so that the temperature of the molten resin measured by the temperature sensor 19 falls into the range of the glass transition temperature (Tg) of the molten resin +70° C. to Tg +150° C. At the same time, the speed control device 21 controls the rotational speed of the cooling drum 14 so that the lip clearance ratio (D/W) is 1.5 to 10. The relation between the lip clearance ratio and the rotational speed is determined by a test or the like, and the data may be previously inputted to the speed control device 21. Herein, the lip clearance ratio (D/W) refers to a ratio of the lip clearance (D) of the die 12 to the thickness (W) of the molten resin extruded from the die 12. The faster the rotational speed of the cooling drum 14, the higher the lip clearance ratio. This suppresses the retardation (Re) of the cellulose acylate film generated in the film forming step 10 due to stretching action to the range of −10 to 80 nm. Preferably, the jacket 13 has a function of not only heating but also cooling in this case as well.

As shown in FIGS. 1 and 2, it is preferred that the distance (L) for the molten resin extruded from the outlet of the die 12 to land on the cooling drum 14 is in the range of 5 to 200 mm. When the distance (L) is in this range, the distribution in the retardation (Re) of the cellulose acylate film in the width direction can be kept to 20 nm or less. The distribution in the retardation (Re) herein described refers to a difference between the maximum and the minimum of the retardation (Re).

Figure 3:
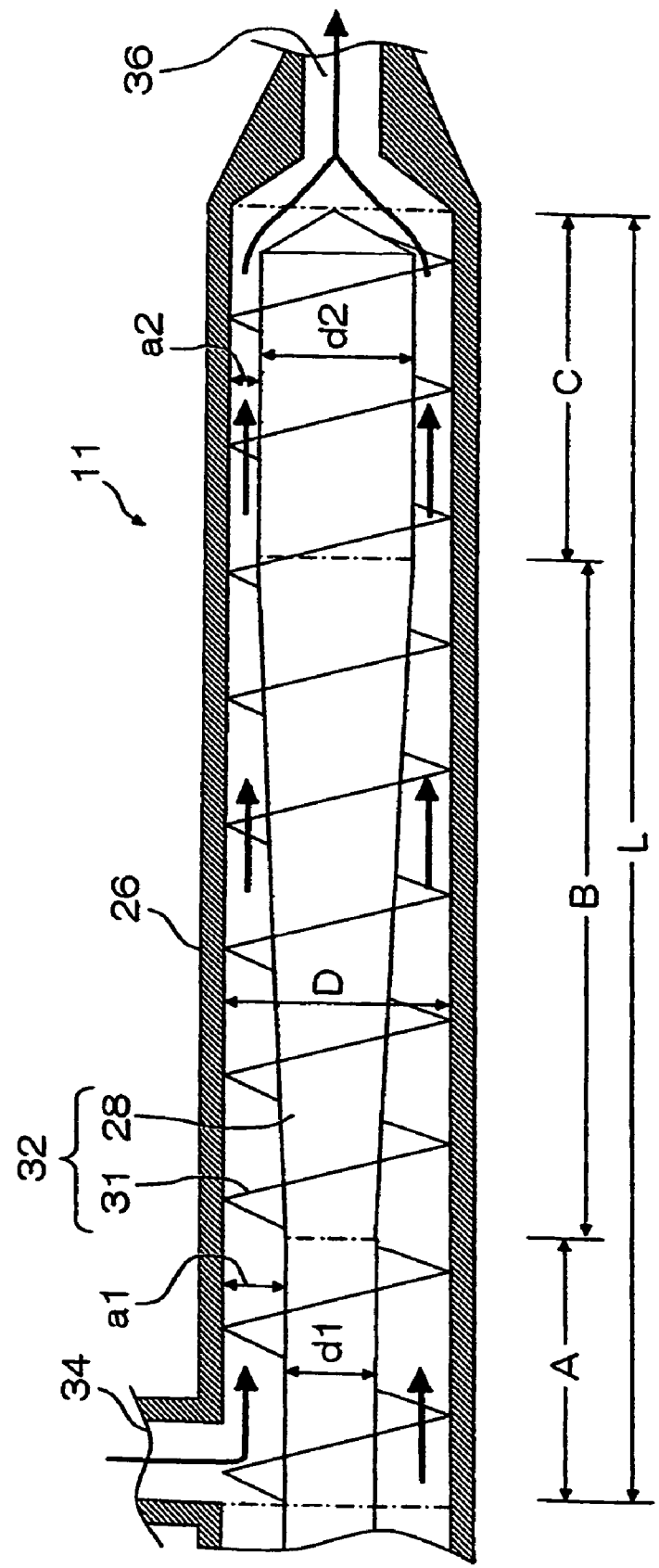
FIG. 3 is a schematic diagram illustrating the structure of an extruder.

FIG. 3 is a cross-sectional view illustrating a single screw extruder 11.

As shown in FIG. 3, a single screw 32 having a flight 31 on a screw shaft 28 is disposed in a cylinder 26. A cellulose acylate resin is supplied to the cylinder 26 from an unrepresented hopper through a supply port 34. The cylinder 26 is comprised of, from the supply port 34 side, a supply unit (region represented by A) for feeding a fixed amount of a cellulose acylate resin supplied from the supply port 34, a compression unit (region represented by B) for kneading and compressing the cellulose acylate resin and a measurement unit (region represented by C) for measuring the kneaded and compressed cellulose acylate resin. The cellulose acylate resin melted in the extruder 11 is continuously fed to the die through a discharge port 36.

The screw compression ratio of the extruder 11 is set to 2.5 to 4.5, and the L/D is set to 20 to 70. Herein, the screw compression ratio refers to a ratio of volume in the supply unit A to that in the measurement unit C, i.e., the volume per unit length of the supply unit A÷the volume per unit length of the measurement unit C. The ratio is calculated from the outer diameter d1 of the screw shaft 28 in the supply unit A, the outer diameter d2 of the screw shaft 28 in the measurement unit C, the channel diameter a1 in the supply unit A and the channel diameter a2 in the measurement unit C. The L/D is the ratio of the cylinder length (L) to the cylinder bore diameter (D) in FIG. 2. The extrusion temperature is set to 190° C. to 240° C. When the temperature in the extruder 11 is higher than 240° C., a cooler (not shown) may be disposed between the extruder 11 and the die 12.

In the film forming step 10 in the apparatus configured as above, the molten resin melted in the extruder 11 is continuously fed to the die 12, extruded on the rotating cooling drum 14 through the outlet of the die 12 in the form of a sheet, and solidified by cooling. Through this procedure, a cellulose acylate film before stretching which is to be stretched in the longitudinal stretching step 20 and the transverse stretching step 30 is produced. A cooling band (not shown) may also be used instead of the cooling drum 14. Such a cooling band is hung between a drive roller and a driven roller and travels along an elliptical orbit by driving the drive roller.

In the production of a cellulose acylate film before stretching, a molten resin which has landed on the cooling drum 14 through the die 12 is immediately stretched by the rotation of the cooling drum 14, and this produces stretching action in the lengthwise direction of the molten resin discharged in the form of a sheet. Due to this stretching action, retardation (Re) is generated before the formed cellulose acylate film before stretching is stretched in the stretching step 50. This poses problems that the stretching ratio cannot be increased in the stretching step 50 where main longitudinal stretching is performed and that the film is easily broken upon stretching. Generation of stretching action in the film forming step 10 is equivalent to performing longitudinal stretching. Therefore, it is necessary to set the stretching ratio in the longitudinal stretching step 20 after subtracting the generated action, and this poses a problem that the stretching ratio is difficult to control.

Given this, in the present invention, the retardation (Re) in the case where the lengthwise direction of the cellulose acylate film corresponds to the slow axis is measured by a Re measuring device 15 in the production of a cellulose acylate film before stretching as shown in FIG. 1, and the temperature of the molten resin at the outlet of the die 12 is controlled so that the measured retardation falls into the range of −10 to 80 nm.

As described above, when a retardation (Re) caused by the stretching action is about −10 to 80 nm in the case where the lengthwise direction of a cellulose acylate film before stretching in the longitudinal stretching step 20 corresponds to the slow axis, the stretching ratio can be increased in the main stretching step 50 and a cellulose acylate film difficult to be broken can be produced. Further, when the retardation (Re) is about −10 to 80 nm, it does not have much effect on the longitudinal stretching ratio in the main longitudinal stretching step 20, and the retardation (Re) can be accurately controlled to a desired value. As a result, a stretched cellulose acylate film highly oriented and having an appropriate retardation (Re) required from liquid crystal display device manufacturers can be obtained. It is obvious that the cellulose acylate film produced according to the method of the present invention can be used not only as a raw material film for producing a stretched cellulose acylate film but also as a cellulose acylate film product as is.

In the present invention, it is ideal that no stretching action takes place in the film forming step 10, i.e., the retardation (Re) of a cellulose acylate film before stretching is 0 (zero). However, there is no problem if the retardation (Re) is in the range of −10 to 80 nm. The retardation (Re) is in the range of preferably 0 to 50 nm, particularly preferably 0 to 30 nm.

Further, as another approach to keep the retardation (Re) of the cellulose acylate film before stretching to the range of −10 to 80 nm, it may also be possible that the temperature of the molten resin at the outlet of the die 12 is measured by the temperature sensor 19 as shown in FIG. 2 above to control the measured temperature to the range of the glass transition temperature (Tg) of the molten resin +70° C. to Tg +150° C., and simultaneously, the lip clearance ratio (D/W) which is a ratio of the lip clearance (D) of the die to the thickness (W) of the molten resin extruded from the die 12 is controlled to the range of 1.5 to 10.

In the present invention, the extruder 11 preferably has a screw compression ratio of 2.5 to 4.5 and an L/D of 20 to 70, and the temperature of the molten resin at the outlet of the extruder 11 is preferably 190° C. to 240° C. This is because these conditions make it possible to produce a cellulose acylate film difficult to be yellowed and difficult to be broken upon stretching.

The extruder 11 may be a single screw extruder or a twin screw extruder. When the screw compression ratio is far below 2.5, kneading may be insufficient and some portions remain undissolved. Further, since heat generation by shearing is small, melting of crystal is insufficient and minute crystal tends to remain in the produced cellulose acylate film. In addition, bubbles may be easily incorporated. As a result, when such a cellulose acylate film is stretched, remaining crystal interferes with stretcheability, making it impossible to improve orientation sufficiently. On the other hand, when the screw compression ratio is far above 4.5, the resin receives extremely high shearing stress and is thus easily degraded by heat, and so the produced cellulose acylate film is easily yellowed. Further, such extremely high shearing stress causes breaking of molecules, and then the molecular weight is decreased and the mechanical strength of the film is lowered. Accordingly, in order to suppress yellowing of the produced cellulose acylate film and prevent breaking of the film upon stretching, the screw compression ratio is in the range of preferably 2.5 to 4.5, more preferably 2.8 to 4.2, particularly preferably 3.0 to 4.0.

Further, when the L/D is far below 20, melting and kneading may be insufficient, and minute crystal may remain in the produced cellulose acylate film as in the case of low compression ratios. On the other hand, when the LID is far above 70, the residence time of the cellulose acylate resin in the extruder 11 is too long, and the resin tends to be degraded. Such a long residence time also causes breaking of molecules, and then the molecular weight is decreased and the mechanical strength of the film is lowered. Accordingly, in order to suppress yellowing of the produced cellulose acylate film and prevent breaking of the film upon stretching, the L/D is in the range of 20 to 70, preferably 22 to 45, particularly preferably 24 to 40.

When the extrusion temperature is far below 190° C., melting of crystal may be insufficient and minute crystal tends to remain in the produced cellulose acylate film. When such a cellulose acylate film is stretched, remaining crystal interferes with stretcheability, making it impossible to improve orientation sufficiently. When the extrusion temperature is much higher than 240° C., the cellulose acylate resin is degraded and the degree of yellowing (YI value) becomes poor. Accordingly, in order to suppress yellowing of the produced cellulose acylate film and prevent breaking of the film upon stretching, the extrusion temperature is in the range of 190° C. to 240° C., preferably 195° C. to 235° C., particularly preferably 200° C. to 230° C.

The cellulose acylate film before stretching of the present invention formed in the film forming step 10 satisfies property values of:

(a) a retardation (Re) of −10 to 80 nm in the case where the lengthwise direction of the film corresponds to the slow axis, (b) when X represents a degree of substitution by an acetyl group and Y represents the total degree of substitution by a propionyl group, a butyryl group, a pentanoyl group and a hexanoyl group, an acylate group having the following degree of substitution:

$2.0 \leq X+Y \leq 3.0, 0 \leq X \leq 2.0, 1.2 \leq Y \leq 2.9$, and (c) a yellowness index (YI value) of 10 or less.

Accordingly, when the above (a) is satisfied, a cellulose acylate film difficult to be broken even if the stretching ratio is increased upon stretching the cellulose acylate film in the longitudinal stretching step 20 and whose retardation (Re) is easily controllable to a desired value can be obtained as described above. Further, since the cellulose acylate film which satisfies the above substitution degree (b) has characteristics of a low melting point, ease in stretching and excellent moisture resistance in combination with the above (a), a stretched cellulose acylate film excellent as a functional film such as a retardation film in a liquid crystal display device can be obtained. The above substitution degree (b) is described in more detail in the later section of "cellulose acylate resin suitable for the present invention". Further, when the above (c) is satisfied, a high quality cellulose acylate film with a low yellowing degree can be obtained. In that case, the retardation (Re) in the above (a) is in the range of preferably 0 to 50 nm, more preferably 0 to 30 nm.

The cellulose acylate film before stretching of the present invention preferably has a haze value of 2.0% or less. The haze is an index of whether the extrusion temperature is too low or not, in other words, an index for determining the amount of crystal remaining in the produced cellulose acylate film. When the haze value is more than 2.0%, a greater amount of minute crystal remain in the produced cellulose acylate film, and the film may be easily broken upon stretching.

The cellulose acylate film before stretching of the present invention has good stretcheability, i.e., an elongation at break of 50% or more (1.5 times or more compared to that before stretching) when uniaxially stretched at the glass transition temperature Tg +10° C.

The cellulose acylate film having these property values and stretcheability is stretched in the longitudinal stretching step 20 and the transverse stretching step 30.

In the following, the stretching step of producing a stretched cellulose acylate film by stretching the cellulose acylate film produced in the film forming step 10 is described.

The cellulose acylate film 16 is stretched so as to orient molecules in the cellulose acylate film 16 for generating in-plane retardation (Re) and retardation (Rth) in the thickness direction. Herein, the retardations Re and Rth are calculated by the following formulas.

$$Re(\text{nm}) = |n(MD) - n(TD)| \times T(\text{nm})$$

$$Rth(\text{nm}) = |\{n(MD) + n(TD))/2\} - n(TH)| \times T(\text{nm})$$

In the formula, n(MD), n(TD) and n(TH) are the refractive indexes in the lengthwise direction, the width direction and the thickness direction, and T is thickness in nm.

As shown in FIG. 1 and FIG. 2, the cellulose acylate film 16 is first longitudinally stretched in the lengthwise direction in the longitudinal stretching step 20. In the longitudinal stretching step 20, after the cellulose acylate film 16 is pre-heated, the heated cellulose acylate film 16 is wound on the two nip rolls 22,24. The nip roll 24 on the exit side carries the cellulose acylate film 16 at a carrying rate faster than that of the nip roll 22 on the entrance side. By this setting, the cellulose acylate film 16 is stretched in the lengthwise direction.

The longitudinally stretched cellulose acylate film 16 is transferred to the transverse stretching step 30 and transversely stretched in the width direction. In the transverse stretching step 30, a tenter, for example, can be preferably used. Using the tenter, both ends of the cellulose acylate film 16 in the width direction are held by clips and the film is stretched in the transverse direction. This transverse stretching yields a greater retardation Rth.

As a result of such stretching, a stretched cellulose acylate film having a thickness of 30 to 300 μm, an in-plane retardation (Re) of 0 nm to 500 nm, more preferably 10 nm to 400 nm, further preferably 15 nm to 300 nm, and a retardation (Rth) in the thickness direction of 30 nm to 500 nm, more preferably 50 nm to 400 nm, further preferably 70 nm to 350 nm is preferably obtained.

Of such films, those satisfying Re≦Rth are preferred, and those satisfying Re×2≦Rth are more preferred. To achieve such a high Rth and a low Re, it is preferred that a film which has been longitudinally stretched is stretched in the transverse (width) direction as described above. In other words, while the difference in orientation in the lengthwise direction and the transverse direction corresponds to the difference in the in-plane retardation (Re), by stretching the film in the transverse direction which is perpendicular to the lengthwise direction in addition to the lengthwise direction, the difference in orientation in the length and the transverse directions can be reduced, and the in-plane orientation (Re) can be reduced. On the other hand, because stretching in the transverse direction in addition to the lengthwise direction increases the area ratio, the orientation in the thickness direction increases due to decrease in the thickness, and the Rth can be increased.

Local fluctuation in Re and that in Rth in the width direction and the lengthwise direction are both preferably 5% or less, more preferably 4% or less, further preferably 3% or less.

As described above, according to this embodiment, a stretched cellulose acylate film is produced using a cellulose acylate film produced by the method of the present invention, and therefore breaking of film upon elongation hardly occurs. As a result, high stretching ratios can be achieved and control of the intended retardation (Re) is easy. Further, local fluctuation in Re and Rth in the width direction and the lengthwise direction can be reduced. Consequently, a stretched cellulose acylate film excellent in optical properties can be produced.

In the following, cellulose acylate resins appropriate for the present invention, methods of processing cellulose acylate films and other conditions are described in detail along the procedure.

(1) Plasticizer

A polyhydric alcohol plasticizer is preferably added to the resin for preparing a cellulose acylate film of the present invention. Such a plasticizer not only decreases the elastic modulus, but also has an effect to reduce the difference in the amounts of crystal on both sides of the film.

The content of the polyhydric alcohol plasticizer is preferably 2 to 20% by weight based on cellulose acylate. The content of the polyhydric alcohol is more preferably 3 to 18% by weight, further preferably 4 to 15% by weight.

When the content of the polyhydric alcohol plasticizer is lower than 2% by weight, the above effect cannot be sufficiently obtained. When the content of the polyhydric alcohol plasticizer is higher than 20% by weight, bleed out (deposition of plasticizer on the surface) may occur. Polyhydric alcohol plasticizers that can be specifically used in the present invention include glycerol ester compounds such as glycerol ester and diglycerol ester, polyalkylene glycols such as polyethylene glycol and polypropylene glycol, and compounds in which an acyl group is bonded to a hydroxyl group of polyalkylene glycol, which have good compatibility with cellulose fatty acid ester and exhibit a significant thermoplasticizing effect.

Specific examples of glycerol esters include, but are not limited to, glycerol diacetate stearate, glycerol diacetate palmitate, glycerol diacetate myristate, glycerol diacetate laurate, glycerol diacetate caprate, glycerol diacetate nonanate, glycerol diacetate octanoate, glycerol diacetate heptanoate, glycerol diacetate hexanoate, glycerol diacetate pentanoate, glycerol diacetate oleate, glycerol acetate dicaprate, glycerol acetate dinonanate, glycerol acetate dioctanoate, glycerol acetate diheptanoate, glycerol acetate dicaproate, glycerol acetate divalerate, glycerol acetate dibutyrate, glycerol dipropionate caprate, glycerol dipropionate laurate, glycerol dipropionate myristate, glycerol dipropionate palmitate, glycerol dipropionate stearate, glycerol dipropionate oleate, glycerol tributyrate, glycerol tripentanoate, glycerol monopalmitate, glycerol monostearate, glycerol distearate, glycerol propionate laurate and glycerol oleate propionate. These may be used singly or in combination.

Of these, glycerol diacetate caprylate, glycerol diacetate pelargonate, glycerol diacetate caprate, glycerol diacetate laurate, glycerol diacetate myristate, glycerol diacetate palmitate, glycerol diacetate stearate and glycerol diacetate oleate are preferred.

Specific examples of diglycerol esters include, but are not limited to, mixed acid esters of diglycerol such as diglycerol tetraacetate, diglycerol tetrapropionate, diglycerol tetrabutyrate, diglycerol tetravalerate, diglycerol tetrahexanoate, diglycerol tetraheptanoate, diglycerol tetracaprylate, diglycerol tetrapelargonate, diglycerol tetracaprate, diglycerol tetralaurate, diglycerol tetramyristate, diglycerol tetrapalmitate, diglycerol triacetate propionate, diglycerol triacetate butyrate, diglycerol triacetate valerate, diglycerol triacetate hexanoate, diglycerol triacetate heptanoate, diglycerol triacetate caprylate, diglycerol triacetate pelargonate, diglycerol triacetate caprate, diglycerol triacetate laurate, diglycerol triacetate myristate, diglycerol triacetate palmitate, diglycerol triacetate stearate, diglycerol triacetate oleate, diglycerol diacetate dipropionate, diglycerol diacetate dibutyrate, diglycerol diacetate divalerate, diglycerol diacetate dihexanoate, diglycerol diacetate diheptanoate, diglycerol diacetate dicaprylate, diglycerol diacetate dipelargonate, diglycerol diacetate dicaprate, diglycerol diacetate dilaurate, diglycerol diacetate dimyristate, diglycerol diacetate dipalmitate, diglycerol diacetate distearate, diglycerol diacetate dioleate, diglycerol acetate tripropionate, diglycerol acetate tributyrate, diglycerol acetate trivalerate, diglycerol acetate trihexanoate, diglycerol acetate triheptanoate, diglycerol acetate tricaprylate, diglycerol acetate tripelargonate, diglycerol acetate tricaprate, diglycerol acetate trilaurate, diglycerol acetate trimyristate, diglycerol acetate tripalmitate, diglycerol acetate tristearate, diglycerol acetate trioleate, diglycerol laurate, diglycerol stearate, diglycerol caprylate, diglycerol myristate and diglycerol oleate. These may be used singly or in combination.

Of these, diglycerol tetraacetate, diglycerol tetrapropionate, diglycerol tetrabutyrate, diglycerol tetracaprylate and diglycerol tetralaurate are preferred.

Specific examples of polyalkylene glycol include, but are not limited to, polyethylene glycol and polypropylene glycol having an average molecular weight of 200 to 1000. These may be used singly or in combination.

Specific examples of compounds in which an acyl group is bonded to a hydroxyl group of polyalkylene glycol include, but are not limited to, polyoxyethylene acetate, polyoxyethylene propionate, polyoxyethylene butyrate, polyoxyethylene valerate, polyoxyethylene caproate, polyoxyethylene heptanoate, polyoxyethylene octanoate, polyoxyethylene nonanate, polyoxyethylene caprate, polyoxyethylene laurate, polyoxyethylene myristate, polyoxyethylene palmitate, polyoxyethylene stearate, polyoxyethylene oleate, polyoxyethylene linoleate, polyoxypropylene acetate, polyoxypropylene propionate, polyoxypropylene butyrate, polyoxypropylene valerate, polyoxypropylene caproate, polyoxypropylene heptanoate, polyoxypropylene octanoate, polyoxypropylene nonanate, polyoxypropylene caprate, polyoxypropylene laurate, polyoxypropylene myristate, polyoxypropylene palmitate, polyoxypropylene stearate, polyoxypropylene oleate and polyoxypropylene linoleate. These may be used singly or in combination.

For such polyhydric alcohols to be fully effective, cellulose acylate is preferably formed into a film by melting under the following conditions. Specifically, while mixed pellets of cellulose acylate and polyhydric alcohol are melted in an extruder and extruded through a T die to form a film, the extruder outlet temperature (T2) is preferably higher than the extruder entrance temperature (T1), and the die temperature (T3) is preferably higher than T2. More specifically, temperature is preferably increased as melting proceeds. This is because of the following reasons: when the temperature is high even at the entrance, polyhydric alcohol is first dissolved and liquefied; since cellulose acylate floats in the liquid, it cannot receive sufficient shear force from the screw, and therefore insoluble matters are generated; such a composition which is not mixed sufficiently cannot exhibit the above advantage of the plasticizer, failing to give an effect of suppressing the difference on both sides of the melted film after melt extrusion. Moreover, such insoluble matters form fish eye-type defects after film forming. Such defects do not form a bright point even if observed with a polarizing plate, but are rather visible when observed on a screen by projecting light from the backside of the film. In addition, fish eyes result in tailing at the die outlet and increase die lines.

T1 is preferably 150 to 200° C., more preferably 160 to 195° C., further preferably 165° C. to 190° C. T2 is preferably in the range of 190 to 240° C., more preferably 200 to 230° C., further preferably 200 to 225° C. It is important that these melting temperatures T1, T2 are not higher than 240° C. When the melting temperature is higher than that temperature, the formed film tends to have a higher elastic modulus. This seems to be because since melting is performed at a high temperature, cellulose acylate is decomposed and crosslinking is induced to increase the elastic modulus. The die temperature T3 is preferably 200 to less than 235° C., more preferably 205 to 230° C., further preferably 205° C. to 225° C.

(2) Stabilizer

In the present invention, either or both of a phosphite compound and a phosphorus ester compound is preferably used as a stabilizer. This prevents deterioration over time and improves the problem of die lines. This is because such compounds serve as a leveling agent and removes die lines formed due to ruggedness of the die. Such a stabilizer is added in an amount of preferably 0.005 to 0.5% by weight, more preferably 0.01 to 0.4% by weight, further preferably 0.02 to 0.3% by weight.

(i) Phosphite Stabilizer

Although phosphite anti-coloring agents are not specifically limited, phosphite anti-coloring agents represented by the chemical formulae (general formulae) 1 to 3 are preferred.

Chemical Formula 1

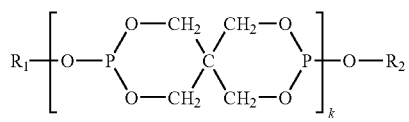

Chemical Formula 2

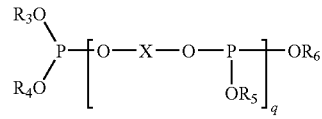

Chemical Formula 3

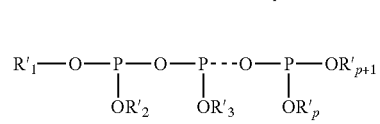

(wherein R1, R2, R3, R4, R5, R6, R'1, R'2, R'3 . . . R'n and R'n+1 represent hydrogen or a group selected from the group consisting of alkyl, aryl, alkoxyalkyl, aryloxyalkyl, alkoxyaryl, arylalkyl, alkylaryl, polyaryloxyalkyl, polyalkoxyalkyl and polyalkoxyaryl having 4 to 23 carbon atoms; provided that they are not simultaneously hydrogen in the respective chemical formulae (general formulae) 1, 2 and 3; X in the phosphite anti-coloring agent represented by the chemical formula (general formula) 2 represents a group selected from the group consisting of aliphatic chains, aliphatic chains containing an aromatic nucleus in a side chain, aliphatic chains containing an aromatic nucleus in a chain and chains containing two or more non-adjacent oxygen atoms in the above chain; and k and q represent an integer of 1 or more, and p represents an integer of 3 or more).

k and q in these phosphite anti-coloring agents are preferably an integer of 1 to 10. k and q are preferably an integer of 1 or more, because volatility upon heating is low, and k and q are preferably an integer of 10 or less, because compatibility with cellulose acetate propionate is improved. p is preferably an integer of 3 to 10. p is preferably an integer of 3 or more, because volatility upon heating is low, and p is preferably an integer of 10 or less, because compatibility with cellulose acetate propionate is improved.

Preferred examples of phosphite anti-coloring agents represented by the following chemical formula 4 (general formula; identical to chemical formula 1) include those represented by the following chemical formulae 5 to 8.

Chemical Formula 4

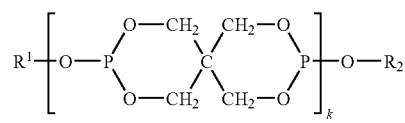

Chemical Formula 5

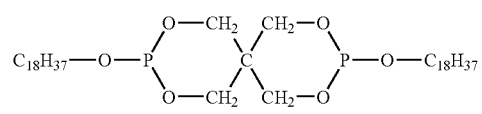

Chemical Formula 6

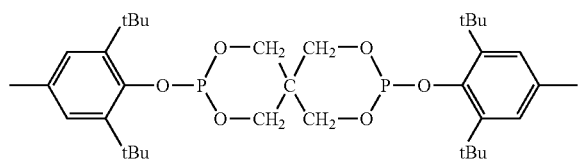

-continued

Chemical Formula 7

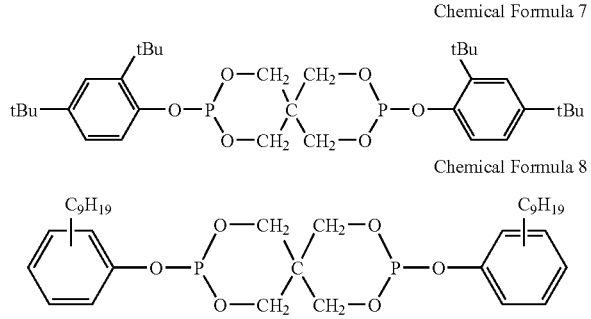

Chemical Formula 8

Preferred examples of phosphite anti-coloring agents represented by the following chemical formula 9 (general formula; identical to chemical formula 2) include those represented by the following chemical formulas 10, 11 and 12.

Chemical Formula 9

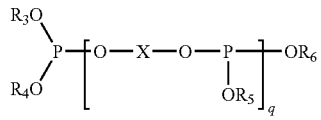

Chemical Formula 10

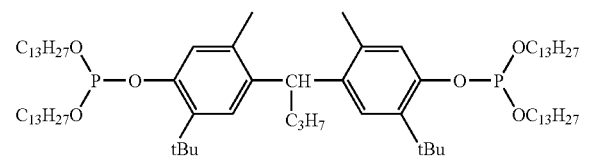

Chemical Formula 11

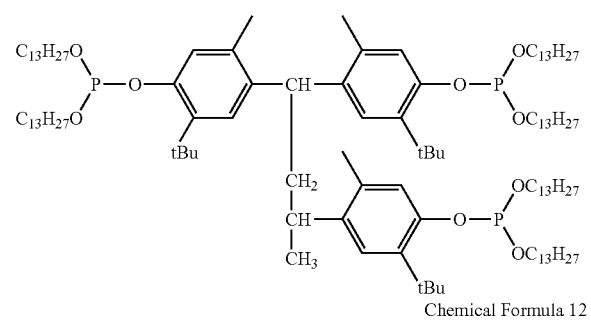

Chemical Formula 12

R = C12-15 alkyl group (ii) Phosphorus Ester Stabilizer

Examples of phosphorus ester stabilizers include cyclic neopentanetetrayl bis(octadecyl)phosphite, cyclic neopentanetetrayl bis(2,4-di-t-butylphenyl)phosphite, cyclic neopentanetetrayl bis(2,6-di-t-butyl-4-methylphenyl)phosphite, 2,2-methylenebis(4,6-di-t-butylphenyl)octyl phosphite and tris(2,4-di-t-butylphenyl)phosphite.

(iii) Other Stabilizers

Weak organic acid, a thioether compound, an epoxy compound or the like may also be added as a stabilizer.

Weak organic acid means organic acid whose pKa is 1 or higher. The weak organic acid is not particularly limited as long as it does not inhibit the action of the present invention and has anti-coloring properties and anti-degradation properties. Examples of weak organic acid include tartaric acid, citric acid, malic acid, fumaric acid, oxalic acid, succinic acid and maleic acid. These may be used singly or in combination of two or more.

Examples of thioether compounds include dilauryl thiodipropionate, ditridecyl thiodipropionate, dimyristyl thiodipropionate, distearyl thiodipropionate and palmityl stearyl thiodipropionate. These may be used singly or in combination of two or more.

Examples of epoxy compounds include those derived from epichlorohydrin and bisphenol A. Derivatives from epichlorohydrin and glycerol, and cyclic compounds such as vinyl cyclohexene dioxide and 3,4-epoxy-6-methylcyclohexylmethyl-3,4-epoxy-6-methylcyclohexane carboxylate may also be used. In addition, epoxidized soybean oil, epoxidized castor oil and long chain α-olefin oxide may also be used. These may be used singly or in combination of two or more.

(3) Cellulose Acylate

<<Cellulose Acylate Resin>>

(Composition, Substitution Degree)

Preferably, the cellulose acylate used in the present invention satisfies all of the requirements represented by the following formulas (1) to (3):

$$2.0 \leq X+Y \leq 3.0 \quad \text{formula (1)}$$

$$0 \leq X \leq 2.0 \quad \text{formula (2)}$$

$$1.2 \leq Y \leq 2.9 \quad \text{formula (3)}$$

(in the formulas (1) to (3), X represents a degree of substitution by an acetate group and Y represents the total degree of substitution by a propionate group, a butyrate group, a pentanoyl group and a hexanoyl group).

The substitution degree is more preferably $$2.4 \leq X+Y \leq 3.0 \quad \text{formula (4)}$$

$$0.05 \leq X \leq 1.8 \quad \text{formula (5)}$$

$$1.3 \leq Y \leq 2.9 \quad \text{formula (6)},$$

further preferably $$2.5 \leq X+Y \leq 2.95 \quad \text{formula (7)}$$

$$0.1 \leq X \leq 1.6 \quad \text{formula (8)}$$

$$1.4 \leq Y \leq 2.9 \quad \text{formula (9)}.$$

As described above, a characteristic of the present invention is to introduce a propionate group, a butyrate group, a pentanoyl group and a hexanoyl group to cellulose acylate. The above ranges are preferred because the melting temperature can be lowered and thermal decomposition upon melt film forming can be prevented. On the other hand, substitution degrees out of this range are not preferred, because the elastic modulus exceeds the scope of the present invention.

The cellulose acylate may be used singly or in combination of two or more. In addition, a polymer component other than cellulose acylate may also be added.

The process for preparing the cellulose acylate used in the present invention is now described in detail. Raw cotton for producing cellulose acylate in the present invention and the method of synthesis of the cellulose acylate are also specifically described in "Kokai Gifo of Japan Institute of Invention & Innovation" (Kogi No. 2001-1745, published Mar. 15, 2001, Japan Institute of Invention & Innovation), pp. 7 to 12.

(Raw Material and Pretreatment)

As raw materials for cellulose, those derived from hardwood pulp, softwood pulp or cotton linter are preferably used. Raw materials for cellulose having a high purity whose α-cellulose content is 92% by mass to 99.9% by mass are preferably used.

When raw materials for cellulose are in the form of film or bulk, the materials are preferably previously crushed. Crushing may be continued until they become fluff pieces.

(Activation)

Preferably, raw materials for cellulose are brought into contact with an activating agent (activation) before acylation. As an activating agent, carboxylic acid or water may be used. When water is used, steps for dehydration by adding an excessive amount of acid anhydride after activation, washing with carboxylic acid so as to replace water and adjusting conditions of acylation are preferably included. The activating agent may be adjusted to any temperature before addition. The method of addition may be selected from spraying, dropping and immersing.

Examples of carboxylic acid preferred as an activating agent include carboxylic acid having 2 to 7 carbon atoms (e.g., acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methylvaleric acid, 2,2-dimethylbutyric acid, 2,3-dimethylbutyric acid, 3,3-dimethylbutyric acid, cyclopentanecarboxylic acid, heptanoic acid, cyclohexanecarboxylic acid and benzoic acid). More preferred are acetic acid, propionic acid and butyric acid, and particularly preferred is acetic acid.

Upon activation, a catalyst for acylation such as sulfuric acid may also be added as required. However, since addition of strong acid such as sulfuric acid may accelerate depolymerization, the amount to be added is preferably limited to about 0.1% by mass to 10% by mass based on cellulose. Further, two or more activating agents may be used together, or carboxylic acid anhydride having 2 to 7 carbon atoms may also be added.

The activating agent is added to cellulose in a proportion of preferably 5% by mass or more, more preferably 10% by mass or more, and particularly preferably 30% by mass or more. The amount of activating agent is preferably higher than the lower limit because problems such as decrease in activation degree of cellulose do not arise. The upper limit of the amount of the activating agent is not particularly limited as long as the activating agent does not lower the productivity. The upper limit is preferably 100 times or less, more preferably 20 times or less, particularly preferably 10 times or less the mass of cellulose. Such an activating agent may be added to cellulose in an extremely excessive amount to activate the cellulose, and then the amount of the activating agent may be reduced by performing procedures such as filtration, air drying, heat drying, removal in vacuo and solvent exchange.

The time for activation is preferably 20 minutes or more. The upper limit of the time is not particularly limited as long as it does not affect the productivity, and the time is preferably 72 hours or less, more preferably 24 hours or less, particularly preferably 12 hours or less. The temperature for activation is preferably 0° C. to 90° C., more preferably 15° C. to 80° C., particularly preferably 20° C. to 60° C. The step of activating cellulose may also be performed under increased or reduced pressure. In addition, as a means for heating, electromagnetic waves such as microwave and infrared rays may also be used.

(Acylation)

In the process for preparing cellulose acylate in the present invention, it is preferred that carboxylic acid anhydride is added to cellulose and the mixture is allowed to react in the presence of Bronsted acid or Lewis acid as a catalyst so as to acylate hydroxyl groups of cellulose.

As a process for preparing mixed cellulose acylate, a method in which two carboxylic acid anhydrides are allowed to react as acylating agents by mixing or sequential addition, a method using a mixture of two carboxylic acid anhydrides (e.g., a mixture of acetic anhydride and propionic anhydride), a method comprising synthesizing, in a reaction system, a mixed acid anhydride mixture (e.g., a mixture of acetic anhydride and propionic anhydride) using carboxylic acid anhydride and anhydride of different carboxylic acid (e.g., acetic anhydride and propionic anhydride) as raw materials and allowing the acid anhydride mixture to react with cellulose, or a method comprising once synthesizing cellulose acylate having a substitution degree of less than 3, and then further acylating the remaining hydroxyl groups using acid anhydride or acid halide may be used.

(Acid Anhydride)

Preferred examples of carboxylic acid anhydride include those having 2 to 7 carbon atoms in carboxylic acid, such as acetic anhydride, propionic anhydride, butyric anhydride, 2-methylpropionic anhydride, valeric anhydride, 3-methylbutyric anhydride, 2-methylbutyric anhydride, 2,2-dimethylpropionic anhydride (pivalic anhydride), hexanoic anhydride, 2-methylvaleric anhydride, 3-methylvaleric anhydride, 4-methylvaleric anhydride, 2,2-dimethylbutyric anhydride, 2,3-dimethylbutyric anhydride, 3,3-dimethylbutyric anhydride, cyclopentanecarboxylic anhydride, heptanoic anhydride, cyclohexanecarboxylic anhydride and benzoic anhydride. More preferred are anhydrides such as acetic anhydride, propionic anhydride, butyric anhydride, valeric anhydride, hexanoic anhydride and heptanoic anhydride. Particularly preferred are acetic anhydride, propionic anhydride and butyric anhydride.

For preparing a mixed ester, these acid anhydrides are preferably used in combination. The mixing ratio is preferably determined based on the degree of substitution of mixed ester to be obtained. Generally, acid anhydride is added to cellulose in an excessive amount. Specifically, acid anhydride is added in a proportion of preferably 1.2 to 50 equivalents, more preferably 1.5 to 30 equivalents, particularly preferably 2 to 10 equivalents based on the amount of hydroxyl groups in cellulose.

(Catalyst)

As a catalyst for acylation used for preparing cellulose acylate in the present invention, Bronsted acid or Lewis acid is preferably used. The definition of Bronsted acid and Lewis acid is described in, for example, "Rikagaku Jiten" (Dictionary of Physics and Chemistry) vol. 5 (2000). Examples of preferred Bronsted acid include sulfuric acid, perchloric acid, phosphoric acid, methanesulfonic acid, benzenesulfonic acid and p-toluenesulfonic acid. Examples of preferred Lewis acid include zinc chloride, tin chloride, antimony chloride and magnesium chloride.

Sulfuric acid and perchloric acid are more preferred as catalysts, and sulfuric acid is particularly preferred. The amount to be added of the catalyst is preferably 0.1 to 30% by mass, more preferably 1 to 15% by mass, particularly preferably 3 to 12% by mass based on the amount of cellulose.

(Solvent)

When performing acylation, a solvent may be added in order to adjust viscosities, reaction rates, stirrability and acyl substitution ratios. While dichloromethane, chloroform, carboxylic acid, acetone, ethyl methyl ketone, toluene, dimethyl sulfoxide and sulfolane may be used as the solvent, the solvent is preferably carboxylic acid. Examples thereof include carboxylic acid containing 2 to 7 carbon atoms (e.g., acetic acid, propionic acid, butyric acid, 2-methylpropionic acid, valeric acid, 3-methylbutyric acid, 2-methylbutyric acid, 2,2-dimethylpropionic acid (pivalic acid), hexanoic acid, 2-methylvaleric acid, 3-methylvaleric acid, 4-methylvaleric acid, 2,2-dimethylbutyric acid, 2,3-dimethylbutyric acid, 3,3-dimethylbutyric acid and cyclopentanecarboxylic acid). More preferred are acetic acid, propionic acid and butyric acid. These solvents may be used in a mixture.

(Conditions of Acylation)

When performing acylation, acid anhydride and a catalyst, and if necessary, a solvent, may be mixed, and then the mixture is added to cellulose. Alternatively, these components may be individually sequentially mixed with cellulose. Generally, however, it is preferred that a mixture of acid anhydride and a catalyst or a mixture of acid anhydride, a catalyst and a solvent is prepared as an acylating agent, and then the acylating agent is allowed to react with cellulose. To prevent increase in the temperature in the reactor due to the heat of reaction during acylation, the acylating agent is preferably previously cooled. The acylating agent is cooled to a temperature of preferably −50° C. to 20° C., more preferably −35° C. to 10° C., particularly preferably −25° C. to 5° C. The acylating agent may be added as a liquid or may be frozen and added as a solid such as crystal, flakes or block.

The acylating agent may be added to cellulose in one or several portions. Alternatively, cellulose may be added to the acylating agent in one or several portions. When adding such an acylating agent in divided portions, an acylating agent of the same composition may be used, or a plurality of acylating agents of a different composition may be used. Preferred examples of addition include 1) adding a mixture of acid anhydride and a solvent first and then adding a catalyst, 2) adding a mixture of acid anhydride, a solvent and part of a catalyst first, and then adding a mixture of the rest of the catalyst and a solvent, 3) adding a mixture of acid anhydride and a solvent first, and then adding a mixture of a catalyst and a solvent, and 4) adding a solvent first, and then adding a mixture of acid anhydride and a catalyst or a mixture of acid anhydride, a catalyst and a solvent.

The acylation of cellulose is an exothermic reaction. In the process for preparing cellulose acylate in the present invention, the highest temperature to be reached in the acylation is preferably 50° C. or lower. A reaction temperature lower than this temperature is preferred because the problem that a cellulose acylate having a polymerization degree appropriate for the purpose of the present invention is difficult to obtain due to the progress of depolymerization does not arise. The highest temperature to be reached in the acylation is preferably 45° C. or lower, more preferably 40° C. or lower, particularly preferably 35° C. or lower. The reaction temperature may be controlled using a temperature controller, or according to the initial temperature of the acylating agent. The reaction temperature may also be controlled by the heat of vaporization of liquid components in the reaction system by reducing the pressure inside the reactor. Since the generation of heat upon acylation is greater at an initial stage of the reaction, the temperature may also be controlled by cooling at the initial stage of the reaction and heating later on. The end point of the acylation can be determined from light transmittance, solution viscosities, temperature change in the reaction system, solubility of the reactant in an organic solvent and observation by a polarization microscope.

The lowest reaction temperature is preferably not lower than −50° C., more preferably not lower than −30° C., further preferably not lower than −20° C. The time for acylation is preferably 0.5 hour to 24 hours, more preferably 1 hour to 12 hours, particularly preferably 1.5 hours to 6 hours. When the time for acylation is less than 0.5 hour, the reaction does not proceed sufficiently under usual reaction conditions. When the time is more than 24 hours, it is not appropriate for industrial production.

(Reaction Terminator)

In the process for preparing cellulose acylate used in the present invention, a reaction terminator is preferably added after the acylation reaction.

For such a reaction terminator, any material may be used as long as it decomposes acid anhydride. Preferred examples thereof include water, alcohol (e.g., ethanol, methanol, propanol, isopropyl alcohol) and compositions containing these. The reaction terminator may also contain a neutralizer described below. When adding a reaction terminator, adding a mixture of carboxylic acid such as acetic acid, propionic acid or butyric acid and water is better than directly adding water or alcohol in order to avoid problems such as causing decrease in polymerization degree of cellulose acylate due to generation of a large amount of heat beyond the cooling capability of the reactor or precipitation of cellulose acylate in an unwanted state. Particularly preferably carboxylic acid is acetic acid. Carboxylic acid and water may be used in any composition ratio, but the water content is preferably 5% by mass to 80% by mass, more preferably 10% by mass to 60% by mass, particularly preferably 15% by mass to 50% by mass.

The reaction terminator may be added to the reactor for acylation, or the reactant may be added to the container containing the reaction terminator. The reaction terminator is added over 3 minutes to 3 hours. The time for addition is preferably 3 minutes or more, because problems that generation of too much heat causes decrease in polymerization degree, hydrolysis of acid anhydride becomes insufficient and that stability of cellulose acylate is decreased do not arise. The time for addition is preferably 3 hours or less, because problems such as decrease in industrial productivity do not arise. The reaction terminator is added over preferably 4 minutes to 2 hours, more preferably 5 minutes to 1 hour, particularly preferably 10 minutes to 45 minutes. Upon addition of the reaction terminator, the reactor may or may not be cooled, but for suppressing depolymerization, the reactor is preferably cooled to prevent temperature increase. Alternatively, the reaction terminator is preferably previously cooled.

(Neutralizer)

During or after the step of terminating the acylation reaction, a neutralizer (e.g., carbonate, acetate, hydroxide or oxide of calcium, magnesium, iron, aluminum or zinc) or a solution thereof may be added so as to hydrolyze excessive carboxylic anhydride remaining in the system or to neutralize part or all of carboxylic acid and esterification catalysts. Preferred examples of solvents for such neutralizers include water, alcohols (e.g., ethanol, methanol, propanol, isopropyl alcohol), carboxylic acids (e.g., acetic acid, propionic acid, butyric acid), ketones (e.g., acetone, ethyl methyl ketone), polar solvents such as dimethyl sulfoxide and mixed solvents thereof.

(Partial Hydrolysis)

The cellulose acylate thus obtained has a total substitution degree of about 3. To obtain cellulose acylate having a desired substitution degree, however, the acyl substitution in cellulose acylate is generally reduced to a desired degree by partially hydrolyzing ester bonds by keeping at 20 to 90° C. for several minutes to several days in the presence of a small amount of a catalyst (generally, a catalyst for acylation such as remaining sulfuric acid) and water (so called aging). Since sulfate in cellulose is also hydrolyzed during the partial hydrolysis, the amount of sulfate bonded to cellulose can be reduced by controlling the conditions of hydrolysis.

Preferably, when a desired cellulose acylate is obtained, the catalyst remaining in the system is completely neutralized using a neutralizer or a solution thereof described above to terminate partial hydrolysis. It is also preferred that a neutralizer which produces a salt with low solubility in the reaction solution (e.g., magnesium carbonate or magnesium acetate) is added in order to effectively remove catalysts (e.g., sulfate) in the solution or bonded to cellulose.

(Filtration)

The reaction mixture (dope) is preferably filtered in order to eliminate or reduce unreacted substances, hardly soluble salts or other contaminants in cellulose acylate. Filtration may be performed at any step after completion of the acylation to reprecipitation. The reaction mixture is also preferably diluted with an appropriate solvent before filtration for controlling the filtration pressure and handling properties.

(Reprecipitation)

By adding the cellulose acylate solution thus obtained to water or a poor solvent such as an aqueous solution of carboxylic acid (e.g., acetic acid, propionic acid), or adding a poor solvent to the cellulose acylate solution, cellulose acylate is reprecipitated, and then washed and stabilized to give the intended cellulose acylate. Reprecipitation may be performed continuously or batchwise in a given quantity. It is also preferred that, by adjusting the concentration of the cellulose acylate solution and the composition of the poor solvent based on substitution pattern or polymerization degree of cellulose acylate, the form and the molecular weight distribution of reprecipitated cellulose acylate are controlled.

(Washing)

The produced cellulose acylate is preferably washed. Any washing solvent may be used as long as it has low solubility for cellulose acylate and is capable of removing impurities. Generally, water or warm water is used. The temperature of wash water is preferably 25° C. to 100° C., more preferably 30° C. to 90° C., particularly preferably 40° C. to 80° C. The washing treatment may be performed on a so-called batch system in which filtration and exchange of wash fluid are repeated, or using a continuous washer. It is also preferred that the wastewater generated in the steps of reprecipitation and washing is reused as a poor solvent in the reprecipitation step, or solvents such as carboxylic acid are recovered by means of distillation and reused.

The progress of washing may be traced by any approach. Preferred approaches include hydrogen ion concentration, ion chromatography, electric conductivity, ICP, elemental analysis and atomic absorption spectrum.

With these treatments, catalysts in cellulose acylate (sulfuric acid, perchloric acid, trifluoroacetic acid, p-toluenesulfonic acid, methanesulfonic acid, zinc chloride, etc), neutralizers (e.g., carbonate, acetate, hydroxide or oxide of calcium, magnesium, iron, aluminum or zinc), a reactant of a neutralizer and a catalyst, carboxylic acid (acetic acid, propionic acid, butyric acid) and a reactant of a neutralizer and carboxylic acid can be removed. This is effective for improving stability of cellulose acylate.

(Stabilization)

The cellulose acylate after washing with warm water is preferably treated with an aqueous solution of weak alkali (e.g., carbonate, hydrogen carbonate, hydroxide or oxide of sodium, potassium, calcium, magnesium or aluminum) to further improve stability or reduce odor of carboxylic acid.

The amount of remaining impurities can be controlled by the amount of wash liquid, the temperature and the time of washing, stirring methods, types of washer and the composition and the concentration of the stabilizer. In the present invention, conditions of acylation, partial hydrolysis and washing are determined so that the remaining amount of sulfuric acid species (content of sulfur atom) is 0 to 500 ppm.

(Drying)

In the present invention, to bring the moisture content of cellulose acylate to an appropriate level, cellulose acylate is preferably dried. While drying methods are not particularly limited as long as the intended moisture content can be achieved, drying is preferably effectively performed using heating, blowing, decompression or stirring singly or in combination. The drying temperature is preferably 0 to 200° C., further preferably 40 to 180° C., particularly preferably 50 to 160° C. The moisture content of the cellulose acylate in the present invention is preferably 2% by mass or less, more preferably 1% by mass or less, particularly preferably 0.7% by mass or less.

(Form)

The cellulose acylate in the present invention may take any form such as particles, powder, fiber and bulk. Since particles and powder are preferred as a raw material for producing a film, cellulose acylate after drying may be pulverized or sieved for making particle size uniform or improving handling properties. In the case of cellulose acylate in the form of particles, 90% by mass or more of the particles to be used preferably has a particle size of 0.5 to 5 mm. Further, 50% by mass or more of the particles to be used preferably has a particle size of 1 to 4 mm. Preferably, cellulose acylate particles are as spherical as possible. The cellulose acylate particles in the present invention have an apparent density of preferably 0.5 to 1.3, more preferably 0.7 to 1.2, particularly preferably 0.8 to 1.15. The method of measuring apparent density is defined in JIS K-7365.

The cellulose acylate particles in the present invention have an angle of repose of preferably 10 to 70 degrees, more preferably 15 to 60 degrees, particularly preferably 20 to 50 degrees.

(Polymerization Degree)

The cellulose acylate preferably used in the present invention has an average polymerization degree of 100 to 300, preferably 120 to 250, more preferably 130 to 200. The average polymerization degree can be measured by a limiting viscosity method by Uda et al. (Kazuo Uda and Hideo Saito, Journal of the Society of Fiber Science and Technology, Japan, vol. 18, No. 1, pp. 105-120, 1962), or measurement of molecular weight distribution by gel permeation chromatography (GPC). Such methods are also specifically described in Japanese Patent Application Laid-Open No. 9-95538.

In the present invention, the weight average polymerization degree/number average polymerization degree of cellulose acylate according to GPC is preferably 1.6 to 3.6, more preferably 1.7 to 3.3, particularly preferably 1.8 to 3.2.

The cellulose acylate may be used singly or in a mixture of two or more. A polymer component other than cellulose acylate may also be accordingly added. Preferably, the polymer component to be added has good compatibility with cellulose ester. When formed into a film, the transmittance is 80% or more, more preferably 90% or more, further preferably 92% or more.

SYNTHETIC EXAMPLE OF CELLULOSE ACYLATE

In the following, Synthetic Examples of cellulose acylate used in the present invention are described in more detail, but the present invention is not limited thereto.

Synthetic Example 1

Synthesis of Cellulose Acetate Propionate 150 g of cellulose (hardwood pulp) and 75 g of acetic acid were put in a reactor, i.e., a 5 L separable flask equipped with a reflux device. With heating in an oil bath adjusted to 60° C., the mixture was stirred vigorously for 2 hours. By such pretreatment, the cellulose was swelled and fragmented into fluff pieces. The reactor was put in an ice-water bath at 2° C. for 30 minutes for cooling.

Separately, a mixture of 1545 g of propionic anhydride and 10.5 g of sulfuric acid was prepared as an acylating agent. After cooling to −30° C., the mixture was added to the reactor containing the above pre-treated cellulose in one portion. After 30 minutes, the external temperature was gradually increased and adjusted so that the internal temperature became 25° C. 2 hours after the addition of the acylating agent. The reactor was cooled in an ice-water bath at 5° C. to adjust the temperature so that the internal temperature was 10° C. 0.5 hour after the addition of the acylating agent and 23° C. after 2 hours. The mixture was further stirred for 3 hours while keeping the internal temperature at 23° C. The reactor was cooled in an ice-water bath at 5° C. Thereto was added 120 g of acetic acid containing 25% by mass of water cooled to 5° C. over 1 hour. The internal temperature was increased to 40° C. and the mixture was stirred for 1.5 hours. Subsequently, a solution in which magnesium acetate tetrahydrate is dissolved in acetic acid containing 50% by mass of water in an amount twice the molar amount of sulfuric acid was added to the reactor, and the mixture was stirred for 30 minutes. 1 L of acetic acid containing 25% by mass of water, 500 mL of acetic acid containing 33% by mass of water, 1 L of acetic acid containing 50% by mass of water and 1 L of water were added in that order to precipitate cellulose acetate propionate. The obtained precipitate of cellulose acetate propionate was washed with warm water. By changing the washing conditions in this step, cellulose acetate propionate whose amount of the remaining sulfuric acid species is different was obtained. After washing, stirring was performed in a 0.005% by mass aqueous calcium hydroxide solution at 20° C. for 0.5 hour, and the resultant was washed with water until the pH of the wash fluid became pH 7 and dried in vacuo at 70° C.

As a result of 1H-NMR and GPC analysis, the obtained cellulose acetate propionate had an acetylation degree of 0.30, a propionylation degree of 2.63 and a polymerization degree of 320. The content of the sulfuric acid species was measured according to ASTM D-817-96.

Synthetic Example 2

Synthesis of Cellulose Acetate Butyrate 100 g of cellulose (hardwood pulp) and 135 g of acetic acid were put in a reactor, i.e., a 5 L separable flask equipped with a reflux device. With heating in an oil bath adjusted to 60° C., the mixture was allowed to stand for 1 hour. Then, with heating in an oil bath adjusted to 60° C., the mixture was vigorously stirred for 1 hour. By such pre-treatment, the cellulose was swelled and crushed into fluff pieces. The reactor was put in an ice-water bath at 5° C. for 1 hour to sufficiently cool the cellulose.

Separately, a mixture of 1080 g of butyric anhydride and 10.0 g of sulfuric acid was prepared as an acylating agent. After cooling to −20° C., the mixture was added to the reactor containing the pre-treated cellulose in one portion. After 30 minutes, the external temperature was increased to 20° C. and the mixture was allowed to react for 5 hours. The reactor was cooled in a ice-water bath at 5° C. and 2400 g of a acetic acid containing 12.5% by mass of water cooled to about 5° C. was added over 1 hour. The internal temperature was increased to 30° C., and the mixture was stirred for 1 hour. Subsequently, 100 g of a 50% by mass aqueous magnesium acetate tetrahydrate solution was added to the reactor, and the mixture was stirred for 30 minutes. 1000 g of acetic acid and 2500 g of acetic acid containing 50% by mass of water were gradually added thereto to precipitate cellulose acetate butyrate. The obtained precipitate of cellulose acetate butyrate was washed with warm water. By changing the washing conditions in this step, cellulose acetate butyrate whose amount of the remaining sulfuric acid species is different was obtained. After washing, stirring was performed in a 0.005% by mass aqueous calcium hydroxide solution for 0.5 hour, and the resultant was washed with water until the pH of the wash fluid became pH 7 and dried at 70° C. The obtained cellulose acetate butyrate had an acetylation degree of 0.84, a butyrylation degree of 2.12 and a polymerization degree of 268.

(4) Other Additives (i) Matting Agent

Preferably, fine particles are added as a matting agent. Examples of fine particles used in the present invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. Fine particles containing silicon are preferred because turbidity can be decreased, and silicon dioxide is particularly preferred. Fine particles of silicon dioxide having a primary average particle size of 20 nm or less and an apparent specific gravity of 70 g/liter or more are preferred. Those having an average particle size of primary particles of as small as 5 to 16 nm are particularly preferred because the haze of the film can be decreased. The apparent specific gravity is preferably 90 to 200 g/liter or more, more preferably 100 to 200 g/liter or more. A greater apparent specific gravity is preferred because a dispersion having a higher concentration can be prepared, the haze is improved and agglomerates are decreased.

These fine particles generally form secondary particles having an average particle size of 0.1 to 3.0 μm. These fine particles are present as an agglomerate of primary particles in the film, creating irregularities of 0.1 to 3.0 μm on the surface of the film. The average particle size of secondary particles is preferably 0.2 μm to 1.5 μm, more preferably 0.4 μm to 1.2 μm, most preferably 0.6 μm to 1.1 μm. For determining the primary and secondary particle sizes, particles in the film are observed by a scanning electron microscope and the diameter of a circle circumscribing the particle is defined as the particle size. Further, 200 particles are observed at a different position, and the average value of the particle size was defined as the average particle size. For fine particles of silicon dioxide, for example, commercially available products such as Aerosil R972, R972V, R974, R812, 200, 200V, 300, R202, OX50, TT600 (available from NIPPON AEROSIL CO., LTD.) can be used. Fine particles of zirconium oxide sold, for example, under the trade name Aerosil R976 and R811 (available from NIPPON AEROSIL CO., LTD.) can be used.

Of these, Aerosil 200V and Aerosil R972V are fine particles of silicon dioxide having a primary average particle size of 20 nm or less and an apparent specific gravity of 70 g/liter or more. These particles are particularly preferred because they have a significant effect of reducing the coefficient of friction while keeping low turbidity of the optical film.

(ii) Other Additives

In addition to the above, various additives, for example, ultraviolet protective agents (e.g., hydroxybenzophenone compounds, benzotriazole compounds, salicylic ester compounds, cyanoacrylate compounds), infrared absorbers, optical anisotropy controller, surfactant and odor trapping agent (amine etc.)) can be added. Materials whose details are described in "Kokai Gifo of Japan Institute of Invention & Innovation", Kogi No. 2001-1745 (published Mar. 15, 2001, Japan Institute of Invention & Innovation), pp. 17 to 22 are preferably used.

An infrared absorbing dye described, for example, in Japanese Patent Application Laid-Open No. 2001-194522 may be used. An ultraviolet absorber described, for example, in Japanese Patent Application Laid-Open No. 2001-151901 may be used. Preferably, each is included in cellulose acylate in a proportion of 0.001 to 5% by mass.

Examples of optical anisotropy controller include retardation adjusters. For example, those described in Japanese Patent Application Laid-Open Nos. 2001-166144, 2003-344655, 2003-248117 and 2003-66230 may be used. Such an optical anisotropy controller can control in-plane retardation (Re) and retardation (Rth) in the thickness direction. The optical anisotropy controller is added in a proportion of preferably 0 to 10 wt %, more preferably 0 to 8 wt %, and further preferably 0 to 6 wt %.

(5) Properties of Cellulose Acylate Mixture

Preferably, the above cellulose acylate mixture (a mixture of cellulose acylate, a plasticizer, a stabilizer and other additives) satisfies the following properties.

(i) Weight Reduction

The thermoplastic cellulose acetate propionate composition in the present invention has a weight reduction ratio upon heating at 220° C. of 5% by weight or less. The weight reduction ratio upon heating herein described means the ratio of weight reduction at 220° C. when a sample is heated from room temperature at a temperature increase rate of 10° C./minute under a nitrogen gas atmosphere. By forming the above cellulose acylate mixture, the weight reduction ratio upon heating can be 5% by weight or less. The weight reduction ratio upon heating is more preferably 3% by weight or less, further preferably 1% by weight or less. By employing this condition, defects generated in the film (generation of bubbles) can be prevented.

(ii) Melt Viscosity

The thermoplastic cellulose acetate propionate composition in the present invention has a melt viscosity at 220° C., 1 sec$^{-1}$ of preferably 100 to 1000 Pa·sec, more preferably 200 to 800 Pa·sec, further preferably 300 to 700 Pa·sec. By adjusting to such a high melt viscosity, the film is not extended (stretched) by the tension at the outlet of the die, and therefore increase in optical anisotropy (retardation) caused by orientation by stretching can be prevented.

Such viscosities may be adjusted by any process, and are adjustable, for example, by the polymerization degree of cellulose acylate or the amount of additives such as a plasticizer.

(6) Pelletization

The cellulose acylate and additives described above are preferably mixed and pelletized before melt film forming.

For pelletization, cellulose acylate and additives are preferably previously dried, but a vented extruder may also be used instead of performing drying. When performing drying, methods such as heating in a heating furnace at 90° C. for 8 hours may be employed, but the method is not limited thereto. Pellets can be prepared by melting the cellulose acylate and additives described above using a twin screw extruder at 150° C. to 250° C., and solidifying and cutting the same extruded like noodles in water. Alternatively, pelletization may be performed by an underwater cutting method in which the molten materials is cut while being extruded into water directly through a nozzle after melting in an extruder.

For an extruder, any known single screw extruder, a non-intermeshing counter-rotating twin screw extruder, an intermeshing counter-rotating twin screw extruder and an intermeshing co-rotating twin screw extruder may be used.

As to a preferred size of the pellets, they have a cross sectional area of 1 mm$^2$ to 300 mm$^2$ and a length of 1 mm to 30 mm, more preferably a cross sectional area of 2 mm$^2$ to 100 mm$^2$ and a length of 1.5 mm to 10 mm.

Upon pelletization, the above described additives can also be introduced from a raw material introduction port or a vent port provided along the extruder.

The rotation number of the extruder is preferably 10 rpm to 1000 rpm, more preferably 20 rpm to 700 rpm, further preferably 30 rpm to 500 rpm. When the rotational speed is lower than that, there is a disadvantage that the residence time is extended, the molecular weight is decreased due to thermal degradation and yellowing tends to develop. When the rotational speed is too high, molecules tend to be broken due to shearing, resulting in decrease in molecular weight, and problems such as increased generation of cross-linked gel tend to arise.

In the pelletization, the residence time for extrusion is preferably 10 seconds to 30 minutes, more preferably 15 seconds to 10 minutes, further preferably 30 seconds to 3 minutes. If sufficient melting can be done, the shorter the residence time, the better, because degradation of resin and occurrence of yellowing can be prevented.

(7) Melt Film Forming (i) Drying

Materials pelletized by the above method are preferably used. Before melt film forming, moisture in the pellets is preferably reduced.

In the present invention, to bring the moisture content of cellulose acylate to an appropriate level, cellulose acylate is preferably dried. As to the drying method, drying is mostly performed using a dehumidification dryer, but drying methods are not particularly limited as long as the intended moisture content can be achieved (preferably, drying is effectively performed using heating, blowing, decompression or stirring singly or in combination. More preferably, the hopper dryer has a heat insulation structure). The drying temperature is preferably 0 to 200° C., further preferably 40 to 180° C., particularly preferably 60 to 150° C. When the drying temperature is too low, there is a disadvantage that not only drying takes time, but also the moisture content does not reach the intended value or lower. On the other hand, when the drying temperature is too high, there is a disadvantage that resin is adhered and causes blocking. The amount of drying air is preferably 20 to 400 m$^3$/hour, more preferably 50 to 300 m$^3$/hour, particularly preferably 100 to 250 m$^3$/hour. When the amount of drying air is small, the drying efficiency is disadvantageously low. On the other hand, even if the amount of drying air is increased, increase in the drying effect is small when the amount is above a certain level, and this is uneconomical. The dewpoint of the drying air is preferably 0 to −60° C., more preferably −10 to −50° C., particularly preferably −20 to −40° C. The drying time is required to be at least 15 minutes, is further preferably 1 hour or more, particularly preferably 2 hours or more. Even if drying is performed over 50 hours, the effect of reducing the moisture content is small. Since thermal degradation of the resin becomes a concern, the drying time should not be longer than required. The moisture content of the cellulose acylate in the present invention is preferably 1.0% by mass or less, more preferably 0.1% by mass or less, particularly preferably 0.01% by mass or less.

(ii) Melt Extrusion

The above cellulose acylate resin is supplied to a cylinder through a supply port of an extruder (different from the extruder used for the above pelletization). The cylinder is comprised of, from the supply port side, a supply unit (region A) for feeding a fixed amount of a cellulose acylate resin supplied from the supply port, a compression unit (region B) for melt-kneading and compressing the cellulose acylate resin and a measurement unit (region C) for measuring the melt-kneaded and compressed cellulose acylate resin. The resin is preferably dried by the above method to reduce the moisture content. To prevent oxidation of the molten resin due to the remaining oxygen, drying is more preferably performed in an inert atmosphere (nitrogen, etc) in an extruder or with vacuum evacuating using an extruder having a vent. The screw compression ratio of the extruder is set to 2.5 to 4.5, and the L/D is set to 20 to 70. Herein, the screw compression ratio refers to a ratio of volume in the supply unit A to that in the measurement unit C, i.e., the volume per unit length of the supply unit A÷the volume per unit length of the measurement unit C. The ratio is calculated from the outer diameter d1 of the screw shaft in the supply unit A, the outer diameter d2 of the screw shaft in the measurement unit C, the channel diameter a1 in the supply unit A and the channel diameter a2 in the measurement unit C. The L/D is the ratio of the cylinder length to the cylinder bore diameter. The extrusion temperature is set to 190° C. to 240° C. When the temperature in the extruder is higher than 240° C., a cooler may be disposed between the extruder and the die.

When the screw compression ratio is far below 2.5, melt-kneading may be insufficient and some portions remain undissolved. Further, since heat generation by shearing is too small, melting of crystal is insufficient and minute crystal tends to remain in the produced cellulose acylate film. In addition, bubbles may be easily incorporated. As a result, the strength of the cellulose acylate film is decreased, and when such a cellulose acylate film is stretched, remaining crystal interferes with stretcheability, making it impossible to improve orientation sufficiently. On the other hand, when the screw compression ratio is far above 4.5, the resin receives extremely high shearing stress and is thus easily degraded by heat, and so the produced cellulose acylate film is easily yellowed. Further, such extremely high shearing stress causes breaking of molecules, and then the molecular weight is decreased and the mechanical strength of the film is lowered. Accordingly, in order to suppress yellowing of the produced cellulose acylate film and prevent breaking of the film upon stretching with an increased film strength, the screw compression ratio is in the range of preferably 2.5 to 4.5, more preferably 2.8 to 4.2, particularly preferably 3.0 to 4.0.

Further, when the L/D is far below 20, melting and kneading may be insufficient, and minute crystal tends to remain in the produced cellulose acylate film as in the case of low compression ratios. On the other hand, when the LID is far above 70, the residence time of the cellulose acylate in the extruder is too long, and the resin tends to be degraded. Such a long residence time also causes breaking of molecules, and then the molecular weight is decreased and the mechanical strength of the film is lowered. Accordingly, in order to suppress yellowing of the produced cellulose acylate film and prevent breaking of the film upon stretching with an increased film strength, the L/D is in the range preferably of 20 to 70, more preferably 22 to 65, particularly preferably 24 to 50.

Preferably, the extrusion temperature is set to the above temperature range. The cellulose acylate film thus obtained has property values of a haze of 2.0% or less and yellowness index (YI value) of 10 or less.

Herein, the haze is an index of whether the extrusion temperature is too low or not, in other words, an index for determining the amount of crystal remaining in the produced cellulose acylate film. When the haze value is more than 2.0%, the strength of the produced cellulose acylate film may decrease and the film tends to be broken upon stretching. The yellowness index (YI value) is an index of whether the extrusion temperature is too high or not. A yellowness index (YI value) of 10 or less means that there is no problem of yellowing.

As to the types of extruders, generally single screw extruders whose equipment cost is relatively low are often used. Types of the screw include a full-flight screw, a Maddock screw and a Dulmage screw. For cellulose acylate resins which have relatively poor thermal stability, full flight screws are preferred. Although it involves high equipment cost, a twin screw extruder whose screw segment is modified and to which a vent port is provided along the body to be able to perform extrusion while discharging unnecessary volatile components may also be used. Twin screw extruders are roughly classified into co-rotating types and counter-rotating types. Although both can be used, co-rotating types in which residence areas are not easily formed and which have high self-cleaning ability are preferred. Although twin screw extruders requires high equipment cost, they are suitable for producing a film of a cellulose acetate resin because they have high kneadability and high resin supply ability, enabling extrusion at low temperatures. By providing a vent port at an appropriate position, cellulose acylate pellets or powder which have not been dried can be directly used. Moreover, pieces of films produced during film forming can be directly reused without drying.

Although the screw has different diameters depending on the intended extrusion amount per unit time, the diameter is preferably 10 mm to 300 mm, more preferably 20 mm to 250 mm, further preferably 30 nun to 150 mm.

(iii) Filtration

For filtering contaminants in the resin or avoiding damage on a gear pump due to such contaminants, a filter material is preferably disposed at the outlet of an extruder to perform so-called breaker plate type filtration. Also, to filter contaminants with a higher degree of accuracy, a filtering device incorporating so-called leaf disc filter is preferably disposed after the gear pump. One filtration area may be provided to perform filtration, or multi-stage filtration with a plurality of filtration areas may be performed. The higher the filtration accuracy the filter material has, the better. However, in view of the pressure resistance of the filter material and increase in the filtration pressure due to a clogged filter material, the filtration accuracy is preferably 15 µm to 3 µm, more preferably 10 µm to 3 µm. In particular, when using leaf disc filter type equipment which filters contaminants at final stages, a filter material with high filtration accuracy is preferably used in view of quality. To ensure pressure resistance and an appropriate filter life, the number of filter materials to be installed may be adjusted. For such filter materials, steel materials are preferably used because they are used at high temperatures under high pressures. Among such steel materials, stainless steel and steel are preferably used. For preventing corrosion, use of stainless steel is particularly desired. As to the structure of the filter material, those obtained by twisting wire or sintered filter materials formed by sintering metal filament or metal powder may be used. In view of filtration accuracy and filter life, sintered filter materials are preferred.

(iv) Gear Pump

To improve uniformity in the thickness, reducing fluctuation in the discharge amount is important. Disposing a gear pump between the extruder and the die and supplying a fixed amount of a cellulose acylate resin through the gear pump is effective. Such a gear pump has a pair of gears, i.e., a drive gear and a driven gear engaged with each other. By driving the drive gear to engage and rotate the two gears, molten resin is sucked into the cavity through a suction port provided on the housing, and the resin is discharged through a discharge port also provided on the housing in a constant amount. Even if the pressure of the resin at the tip of the extruder slightly fluctuates, such fluctuation is absorbed by the use of the gear pump, and thus the fluctuation in the pressure of the resin in the downstream of the film forming apparatus becomes very small, and this improves thickness fluctuation. By using a gear pump, the fluctuation of the pressure resin at the die can be kept within ±1%.

To improve the capability of volumetric feeding of gear pumps, an approach of controlling the pressure before a gear pump at a constant value by changing the rotational number of the screw is also applicable. A high accuracy gear pump using 3 or more gears in which fluctuation in the gear is eliminated is also effective.

For other advantages of using a gear pump, since film forming can be performed with a decreased pressure at the screw tip, reduction of energy consumption, prevention of increase in the resin temperature, improvement in transportation efficiency, shortening of the residence time in the extruder and reduction of the L/D in the extruder can be expected. Further, when using a filter for removing contaminants, the amount of the resin supplied through the screw may fluctuate due to increase in the filtration pressure in the absence of a gear pump; this problem, however, can be solved by using a gear pump in combination. On the other hand, such a gear pump has a disadvantage that equipment becomes long depending on which equipment is selected, and the residence time of the resin is extended. In addition, due to the shearing stress in the gear pump, molecular chains may be broken. Accordingly, attention must be paid to these disadvantages.

A preferred residence time for a resin which is introduced into the extruder through a supply port and discharged from the die is 2 minutes to 60 minutes, more preferably 3 minutes to 40 minutes, further preferably 4 minutes to 30 minutes.

If the flow of polymer for circulation in a bearing of the gear pump becomes poor, sealing with the polymer at the driving part and the bearing part becomes poor, causing problems such as large fluctuation in the pressure of measurement and the pressure of extrusion and feeding of liquid. Therefore, designing of gear pumps (particularly clearance) in accordance with the melt viscosity of cellulose acylate resin is necessary. Further, in some cases, the residence part in the gear pump gives rise to deterioration of cellulose acylate resin, and therefore a structure with the smallest possible residence is preferred. Polymer tube and adapters connecting the extruder and the gear pump or the gear pump and the die must also be designed with the smallest possible residence. In addition, for stabilization of the extrusion pressure of cellulose acylate resin whose melt viscosity is highly dependent on the temperature, fluctuation in the temperature is preferably kept as small as possible. Generally, a band heater whose equipment cost is low is often used for heating the polymer tube, but an aluminum cast heater with a smaller temperature fluctuation is more preferably used. Further, to stabilize the discharge pressure of the extruder as described above, melting is preferably performed by heating with a heater dividing the barrel of the extruder into 3 to 20 areas.

(v) Die

A cellulose acylate resin is melted in an extruder configured as above, and the molten resin is continuously fed to a die, if necessary, through a filtering device and/or a gear pump. Any type of commonly used dies such as a T-die, a fish-tail die and a hanger coat die may be used as long as the die is designed so that the residence of the molten resin in the die is short. A static mixer may be disposed immediately before the T die in order to improve uniformity of the resin temperature. The clearance of the T die outlet is generally 1.0 to 5.0 times, preferably 1.2 to 3 times, more preferably 1.3 to 2 times the film thickness. When the lip clearance is less than 1.0 time the film thickness, a well-formed sheet is difficult to obtain by film forming. When the lip clearance is larger than 5.0 times the film thickness, the uniformity in the thickness of the sheet is disadvantageously decreased. The die is a very important device for determining the thickness uniformity of the film, and a die capable of precisely controlling the thickness is preferred. The thickness is generally controllable in increments of 40 to 50 mm. Dies capable of controlling the film thickness in increments of preferably 35 mm or less, more preferably 25 mm or less are preferred. Since the melt viscosity of a cellulose acylate resin is highly dependent on the temperature and the shear rate, a design in which unevenness in the temperature of the die and unevenness in the flow rate in the width direction are as small as possible is essential. In addition, an automatic thickness control die in which the film thickness in the downstream is measured to calculate thickness deviation and the result is given as a feedback for controlling the thickness in the die is effective for reducing thickness fluctuation in long-term continuous production.

A single layer film forming apparatus whose equipment cost is low is generally used for producing a film. In some cases, however, a multi-layer film forming apparatus may also be used for forming a functional layer as an outer layer so as to produce a film having two or more structures. Generally, a thin functional layer is preferably stacked on the surface layer, and the ratio of the thickness of the layers is not particularly limited.

(vi) Casting

A molten resin extruded in the form of a sheet through a die according to the above method is solidified by cooling on a cooling drum to give a film. In this step, contact between the cooling drum and the melt-extruded sheet is preferably increased using an electrostatic application method, an air knife method, an air chamber method, a vacuum nozzle method or a touch roll method. Such a method of improving contact may be performed on the entire surface of the melt-extruded sheet or on some part. Particularly, a method called edge pinning, in which only both edges of the film are adhered, is often employed, but the method is not limited thereto.

Preferably, a plurality of cooling drums are used to gradually cool the resin. While using three cooling drums is rather common, the number of drums is not limited thereto. The cooling drum has a diameter of preferably 100 mm to 1000 mm, more preferably 150 mm to 1000 mm. The face-to-face distance between the plural cooling drums is 1 mm to 50 mm, more preferably 1 mm to 30 mm.

The cooling drum is set to preferably 60° C. to 160° C., more preferably 70° C. to 150° C., further preferably 80° C. to 140° C. The resin is then peeled off from the cooling drum and taken up through a pick up roller (nip roll). The take up rate is preferably 10 m/minute to 100 m/minute, more preferably 15 m/minute to 80 m/minute, further preferably 20 m/minute to 70 m/minute.

The filming width is preferably 0.7 m to 5 m, more preferably 1 m to 4 m, further preferably 1.3 m to 3 m. A non-stretched film thus obtained has a thickness of 30 μm to 400 μm, more preferably 40 μm to 300 μm, further preferably 501 m to 200 μm.

When so-called touch roll method is employed, the surface of the touch roll may be made of rubber or resin such as Teflon®, or a metal roll may also be used. A roll called flexible roll obtained by reducing the thickness of the metal roll, whose roll surface is slightly depressed due to pressure upon touching and whose pressing area is thus increased may also be used.

The temperature of the touch roll is preferably 60° C. to 160° C., more preferably 70° C. to 150° C., further preferably 80° C. to 140° C.

(vii) Take Up

Preferably, both ends of the sheet thus obtained are trimmed and the sheet is taken up. The trimmed portions may be crushed, or if necessary, granulated, depolymerized or polymerized again, and reused as a raw material for the same type of film or a different type of film. As a trimming cutter, any cutter such as a rotary cutter, a shear blade and a knife may be used. The material of the cutter may be any one of carbon steels and stainless steels. In general, use of a hard blade or a ceramic blade is preferred because they have a long life and generation of chips upon cutting can be reduced.

Before the take-up, a lamination film is preferably applied to at least one surface for preventing scars. The take up tension is preferably 1 kg/m in width to 50 kg/m in width, more preferably 2 kg/m in width to 40 kg/m in width, more preferably 3 kg/m in width to 20 kg/m in width. When the take-up tension is less than 1 kg/m in width, uniform take up of the film is difficult. On the other hand, a tension of higher than 50 kg/width is not preferred because the film is tightly wound, and not only the appearance of the wound film becomes poor, but also raised portions in the film is extended due to creep, resulting in waving of the film, or residual birefringence is produced due to extension of the film. The take-up tension is detected by tension control along the line, and the film is preferably taken up being controlled to a constant take-up tension. When the film temperature varies depending on the position in the film forming line, films may have a slightly different length due to thermal expansion. Accordingly, it is necessary that the drawing ratio of nip rolls is adjusted so that a tension higher than a pre-determined tension is not applied to the film in the line.

The film can be taken up at a constant tension by the control in the tension control. More preferably, however, the tension is tapered proportional to the roll diameter to determine an appropriate take-up tension. Generally, the tension is gradually reduced as the roll diameter increases, but in some cases, the tension is preferably increased as the roll diameter increases.

(viii) Properties of Non-Stretched Cellulose Acylate Film

The non-stretched cellulose acylate film thus obtained has, when the lengthwise direction of the film corresponds to the slow axis, preferably Re=−10 to 80 nm, Rth=0 to 80 nm, more preferably Re=−5 to 80 nm, Rth=0 to 70 nm, further preferably Re=−5 to 70 nm, Rth=0 to 60 nm. Re, Rth each represent in-plane retardation and retardation in the thickness direction. The Re is measured by introducing light in the direction of the normal line of a film using KOBRA 21ADH (made by Oji Scientific Instruments). The Rth is calculated from retardation values measured in three directions, i.e., the above Re and retardations measured by introducing light in the direction tilted +400 or −40° to the normal line of a film with the in-plane slow axis as an inclined axis (rotational axis). Further, the closer the angle θ between the film forming direction (lengthwise direction) and the slow axis of the Re of the film to 0°, +900 or −90°, the better.

The film has a total light transmittance of preferably 90% to 100%, more preferably 91 to 99%, further preferably 92 to 98%. The film has a haze of preferably 0 to 1%, more preferably 0 to 0.8%, further preferably 0 to 0.6%.

The film has a thickness unevenness in both the lengthwise direction and the width direction of 0% to 4%, more preferably 0% to 3%, further preferably 0% to 2%.

The film has a tensile modulus of preferably 1.5 kN/mm$^2$ to 3.5 kN/mm$^2$, more preferably 1.7 kN/mm$^2$ to 2.8 kN/mm$^2$, further preferably 1.8 kN/mm$^2$ to 2.6 kN/mm$^2$.

The film has an elongation at break of preferably 3% to 100%, more preferably 5% to 80%, further preferably 8% to 50%.

The Tg (Tg of the film, namely, Tg of a mixture of cellulose acylate and additives) is preferably 95° C. to 145° C., more preferably 100° C. to 140° C., further preferably 105° C. to 135° C.

The dimensional change due to heat of the film at 80° C. for 1 day is preferably 0% to ±1%, more preferably 0% to ±0.5%, further preferably 0% to ±0.3% in both the longitudinal and the transverse directions.

The film has a water permeability at 40° C. and 90% rh of preferably 300 g/m$^2$·day to 1000 g/m$^2$·day, more preferably 400 g/m$^2$·day to 900 g/m$^2$·day, further preferably 500 g/m$^2$·day to 800 g/m$^2$·day.

The film has an equilibrium moisture content at 25° C. and 80% rh of preferably 1 wt % to 4 wt %, more preferably 1.2 wt % to 3 wt %, further preferably 1.5 wt % to 2.5 wt %.

(8) Stretching

The film produced according to the above method can also be stretched, thereby allowing Re and Rth to be controlled.

Stretching is preferably conducted at a temperature between Tg or higher and Tg +50° C. or lower, more preferably between Tg +3° C. or higher and Tg +30° C. or lower, and even more preferably between Tg +5° C. or higher and Tg +20° C. or lower. A preferable stretching ratio is from 1% or more to 300% or less, more preferably from 2% or more to 250% or less, and even more preferably from 3% or more to 200% or less to at least one end. While the film may be equally stretched longitudinally and transversely, it is more preferable to make one of the stretching ratios greater than the other to stretch unequally. Either the length (MD) or width (TD) may be made larger. The smaller stretching ratio is preferably from 1% or more to 30% or less, more preferably from 2% or more to 25% or less, and even more preferably from 3% or more to 20% or less. The larger stretching ratio is preferably from 30% or more to 300% or less, more preferably from 35% or more to 200% or less, and even more preferably from 40% or more to 150% or less. Such stretching may be completed by one stretching procedure or by several stretching procedures. The term "stretching ratio" as used here is determined using the below equation.

Stretching ratio (%)=100×{(length after stretching)−(length before stretching)}/(length before stretching)

Stretching can be performed in a lengthwise direction using two or more pairs of nip rolls whose peripheral speed is higher at the outlet side (longitudinal stretching), or can be performed by gripping the film at both edges with a chuck and spreading in an orthogonal direction (orthogonal to the lengthwise direction) (transverse stretching). In addition, the simultaneous twin screw stretching methods described in Japanese Patent Application Laid-Open Nos. 2000-37772, 2001-113591 and 2002-103445 may also be employed.

For longitudinal stretching, controlling the value (length/width ratio) obtained by dividing nip roll interval by film width enables the ratio between Re and Rth to be freely controlled. That is, by making the length/width ratio smaller, the Rth/Re ratio can be made larger. Re and Rth can also be controlled by combining the longitudinal stretching and transverse stretching. That is, by decreasing the difference between the longitudinal stretching ratio and the transverse stretching ratio, Re can be made smaller, and by increasing the difference, Re can be made larger.

It is therefore preferable for the Re and Rth of a stretched cellulose acylate film to satisfy the below equation, $Rth \geq Re$ $500 \geq Re \geq 0$ $500 \geq Rth \geq 30;$ and more preferably, $Rth \geq Re \times 1.1$ $150 \geq Re \geq 10$ $400 \geq Rth \geq 50;$ and even more preferably $Rth \geq Re \times 1.2$ $100 \geq Re \geq 20$ $350 \geq Rth \geq 80$ The closer the angle θ formed between the film-production direction (lengthwise direction) and the film Re slow axis is to 0°, +90° or −90°, the better. That is, for longitudinal stretching, the closer to 0° the better, so that 0±3° is preferable, 0±2° is more preferable, and 0±1° is even more preferable. For transverse stretching, 90±3° or −90±3° is preferable, 90±2° or −90±2° is more preferable, and 90±1° or −90±1° is even more preferable.

The thicknesses of the cellulose acylate films after stretching are preferably between 30 μm or more and 300 μm or less, more preferably between 30 μm or more and 170 μm or less, and even more preferably between 40 μm or more and 140 μm or less. Thickness unevenness in both the lengthwise and widthwise directions is preferably from 0% or more to 3% or less, more preferably from 0% or more to 2% or less, and even more preferably from 0% or more to 1% or less.

The physical properties of the stretched cellulose acylate films are preferably within the range below.

Tensile elastic modulus is preferably from 1.5 kN/mm² or more to less than 3.0 kN/mm², more preferably from 1.7 kN/mm² or more to 2.8 kN/mm² or less, and even more preferably from 1.8 kN/mm² or more to 2.6 kN/mm² or less.

Elongation at break is preferably between 3% or more and 100% or less, more preferably between 5% or more and 80% or less and even more preferably between 8% or more and 100% or less.

Tg (meaning the film Tg; i.e. the Tg of the mixture of the cellulose acylate film and additives) is preferably from 95° C. or more to 145° C. or less, more preferably from 100° C. or more to 140° C. or less and even more preferably from 105° C. or more to 135° C. or less.

The thermal dimensional change at 80° C. for 1 day is, for both length and width directions, preferably from 0% or more to ±1% or less, more preferably from 0% or more to ±0.5% or less, and even more preferably from 0% or more to ±0.3% or less.

Water permeability coefficient at 40° C. and 90% is preferably between 300 g/m² per day or more and 1,000 g/m² per day or less, more preferably between 400 g/m² per day or more and 900 g/m² per day or less, and even more preferably between 500 g/m² per day or more and 800 g/m² per day or less.

The equilibrium moisture content at 25° C. and 80% rh is preferably from 1% by weight or more to 4% by weight or less, more preferably from 1.2% by weight or more to 3% by weight or less, and even more preferably from 1.5% by weight or more to 2.5% by weight or less.

Thickness is preferably between 30 μm or more and 200 μm or less, more preferably between 40 μm or more and 180 μm or less, and even more preferably between 50 μm or more and 150 μm or less.

Haze is preferably from 0% or more to 2.0% or less, more preferably from 0% or more to 1.5% or less, and even more preferably from 0% or more to 1% or less.

Total light transmittance is preferably from 90% or more to 100% or less, more preferably from 91% or more to 99% or less, and even more preferably from 92% or more to 98% or less.

(9) Surface Treatment

It is possible to improve adhesion between a non-stretched or stretched cellulose acylate film and each functional layer (e.g., an undercoat layer or a backing layer) by subjecting the film to a surface treatment. For example, a glow discharge treatment, UV ray irradiation treatment, corona treatment, flame treatment or treatment with an acid or an alkali may be employed. The glow discharge treatment may be a plasma treatment using a low-temperature plasma generated under a low-pressure gas of $10^{-3}$ to 20 Torr, or may be a plasma treatment under atmospheric pressure. A plasma generating gas is a gas in which a plasma is generated under the above-mentioned conditions. Examples thereof include argon, helium, neon, krypton, xenon, nitrogen, carbon dioxide, flons such as tetrafluoromethane, and mixtures thereof. Detailed descriptions thereon are given in Hatsumei Kyokai Kokai Giho (Kogi Bango 2001-1745, published on Mar. 15, 2001 by Hatsumei Kyokai) on pages 30 to 32. Additionally, plasma treatment under atmospheric pressure which has been noted in recent years employs an irradiation energy of, for example, from 20 to 500 kGy under 10 to 1,000 keV, and more preferably from 20 to 300 kGy under 30 to 500 keV. Of these, an alkali saponification treatment is particularly preferred, and is extremely effective for surface treatment of a cellulose acylate film. Specifically, Japanese Patent Application Laid-Open Nos. 2003-3266, 2003-229299, 2004-322928, 2005-76088 and the like may be employed.

The alkali saponification treatment may be conducted by dipping in a saponifying solution or by coating a saponifying solution. With the dipping method, the cellulose acylate film is passed through a tank of an aqueous solution of NaOH, KOH or the like having a pH of from 10 to 14 and being heated to 20° C. to 80° C. for 0.1 to 10 minutes, followed by neutralization, washing with water and drying.

With the coating method, there may be employed a dip coating method, a curtain coating method, an extrusion coating method, a bar coating method or an E-type coating method. As the solvent for the coating solution to be used for the alkali saponification treatment, preferably selected is a solvent which has good wettability to coat the transparent support of the saponifying solution and which can keep a good surface state without forming unevenness on the surface of the transparent support from the saponifying solution. Specifically, alcoholic solvents are preferred, with isopropyl alcohol being particularly preferred. It is also possible to use an aqueous solution of a surfactant as the solvent. The alkali to be used in the coating solution for alkali treatment is preferably an alkali which dissolves in the above solvent, with KOH and NaOH being preferred. The pH of the coating solution for saponification treatment is preferably 10 or more, more preferably 12 or more. The reaction conditions for the alkali saponification are preferably at room temperature and for from 1 second to 5 minutes or less, more preferably from 5 seconds to 5 minutes or less, and particularly preferably from 20 seconds to 3 minutes or less. After completion of the alkali saponification reaction, the saponification solution-coated surface is preferably washed with water or with an acid then water. It is also possible to continuously conduct the saponification treatment by the coating method and application of an orienting film described hereinafter, which contributes to reduction of the number of steps. These saponification methods are specifically described in, for example, Japanese Patent Application Laid-Open No. 2002-82226 and WO 02/46809 (International Publication of PCT Application) pamphlet.

It is also preferred to provide an undercoat layer for adhesion to a functional layer. This undercoat layer may be provided by coating after the above surface treatment, or may be provided without the surface treatment. Detailed descriptions on the undercoat layer are given in Hatsumei Kyokai Kokai Giho (Kogi Bango 2001-1745, published by Hatsumei Kyokai on Mar. 15, 2001), on page 32.

The surface treatment and the undercoating step can be provided at the final stage of the film-production process, and may be conducted independently or during the step of providing a functional layer to be described hereinafter.

(10) Functional Layer

It is preferred to combine the stretched or non-stretched cellulose acylate film of the present invention with functional layers as described in detail in Hatsumei Kyokai Kokai Giho (Kogi Bango 2001-1745, published by Hatsumei Kyokai on Mar. 15, 2001) on pages 32 to 45. Preferable among such layers are a polarizing layer (to form a polarizing plate), an optical compensatory layer (to form an optical compensatory film), an antireflective layer (to form an antireflective film), and a hard coat layer.

(i) Providing a Polarizing Layer (Preparation of a Polarizing Plate)

[Materials to be Used for the Polarizing Layer]

At present, commercially available polarizing films are generally prepared by dipping a stretched polymer in a solution of iodine or a dichroic dye retained in a tank to thereby permeate iodine or the dichroic cye into the binder. As the polarizing film, a coating type polarizing film represented by that produced by Optiva Inc. may also be used. The iodine or dichroic dye in the polarizing film is oriented in the polymer to exhibit its polarizing ability. Examples of dichroic dyes which can be used include azo dyes, stilbene dyes, pyrazolone dyes, triphenylmethane dyes, quinoline dyes, oxazine dyes, thiazine dyes or anthraquinone dyes. The dichroic dye is preferably water-soluble. The dichroic dye preferably has a hydrophilic substituent (e.g., a sulfo group, an amino group or a hydroxyl group). Examples thereof include the compounds described in Hatsumei Kyokai Kokai Giho, Kogi Bango 2001-1745, on page 58 (published on Mar. 15, 2001).

As the polarizing film binder, either a polymer which itself can cause cross-linking or a polymer which can be linked with a cross-linking agent may be used, and a plurality of combinations thereof may be used. The binder can be a methacrylate copolymer, styrenic copolymer, polyolefin, polyvinyl alcohol or modified polyvinyl alcohol, poly(N-methylolacrylamide), polyester, polyimide, vinyl acetate copolymer, and a carboxymethyl cellulose or polycarbonate described in, for example, Japanese Patent Application Laid-Open No. 8-338913, paragraph [0022]. A silane coupling agent may also be used as the polymer. Preferred examples include water-soluble polymers (e.g., poly(N-methylolacrylamide), carboxymethyl cellulose, gelatin, polyvinyl alcohol and modified polyvinyl alcohol). More preferred are gelatin, polyvinyl alcohol and modified polyvinyl alcohol, and most preferred are polyvinyl alcohol and modified polyvinyl alcohol. It is particularly preferred to use two polyvinyl alcohols or modified polyvinyl alcohols having a different polymerization degree. The saponification degree of the polyvinyl alcohol is preferably from 70 to 100%, and more preferably from 80 to 100%. The polymerization degree of the polyvinyl alcohol is preferably from 100 to 5,000. Descriptions regarding the modified polyvinyl alcohol are given in Japanese. Patent Application Laid-Open Nos. 8-338913, 9-152509 and 9-316127. The polyvinyl alcohol and modified polyvinyl alcohol may be used in combination of two or more thereof.

The lower limit of the binder thickness is preferably 10 μm. In view of light leakage of an image display device, the smaller the thickness the better. Therefore, the thickness upper limit is preferably equal to or smaller than the thickness of presently commercially available polarizing plates (about 30 μm), more preferably equal to or smaller than 25 μm, and particularly preferably equal to or smaller than 20 μm.

The polarizing film binder may be cross-linked. The binder may contain a polymer or monomer having a cross-linkable functional group, or the binder polymer itself may possess a cross-linkable functional group. Cross-linking may be caused by light, heat or change in pH, whereby a binder can be formed having a cross-linked structure. Descriptions regarding the cross-linking agent are given in U.S. Reissued Pat. No. 23,297. Moreover, a boron compound (e.g., boric acid or borax) may be used as the cross-linking agent. The addition amount of the cross-linking agent for the binder is preferably from 0.1 to 20% by mass of the binder, whereby the orientation properties of the polarizing element and resistance to moist heat of the polarizing film improve.

The amount of the unreacted cross-linking agent at the completion of the cross-linking reaction is preferably 1.0% by mass or less, and more preferably 0.5% by mass or less. Such an amount serves to improve weatherability.

[Polarizing Film Stretching]

The polarizing film is preferably dyed with iodine or a dichroic dye after being stretched (stretching method) or rubbed (rubbing method).

With the stretching method, the stretching ratio is preferably from 2.5 to 30.0, and more preferably from 3.0 to 10.0. The stretching can be conducted by dry stretching in air. Also, wet stretching may be employed in a state of being dipped in water. The stretching ratio for dry stretching is preferably from 2.5 to 5.0, and the stretching ratio for wet stretching is preferably from 3.0 to 10.0. The stretching may be conducted in a direction parallel to the MD direction (parallel stretching) or in a slanted direction (slanted stretching). Such stretching may be completed by one stretching procedure or by several stretching procedures. By breaking up into several stretching procedures, a stretching can be conducted more uniformly even at a high stretching ratio. More preferred is a slanted stretching wherein stretching is conducted in a slant direction with a slant of from 10° to 80°.

(I) Parallel Stretching Method

A PVA film is swollen prior to stretching. The swelling degree (ratio of mass after swelling to that before swelling) is from 1.2 to 2.0. Subsequently, the film is stretched in an aqueous medium bath or in a dying bath containing dissolved therein a dichroic substance at a bath temperature of from 15 to 50° C., preferably from 17 to 40° C., while continuously conveying via guide rolls. Stretching can be performed by gripping with two pairs of nip rolls, with the conveying speed of the nip rolls at the latter position being faster than that of the nip rolls at the former position. The stretching ratio is on the ratio of the length after stretching/the initial length (hereinafter the same) and, in view of the above effects, the stretching ratio is from 1.2:to 3.5, and preferably from 1.5 to 3.0. Thereafter, the film is dried at a temperature of from 50° C. to 90° C. to obtain a polarizing film.

(II) Slanted Stretching Method

The method described in Japanese Patent Application Laid-Open No. 2002-86554 may be employed, wherein stretching is conducted using a tenter which overhangs in a slanted direction. Since this stretching is conducted in air, it is necessary to make stretching easier by incorporating water therein. The water content is preferably from 5% or more to 100% or less, the stretching temperature is preferably from 40° C. or more to 90° C. or less, and the humidity during stretching is preferably from 50% rh or more to 100% rh or less.

The absorption axis of the thus-obtained polarizing film is preferably from 10° to 80°, more preferably from 30° to 60°, and particularly preferably substantially 45° (40° to 50°).

[Lamination]

The saponified and stretched or non-stretched cellulose acylate film and the stretched polarizing layer are laminated to each other to prepare a polarizing plate. The lamination direction is not particularly limited, but lamination is preferably conducted so that the angle between the direction of conveying the cellulose acylate film and the direction of the stretching axis of the polarizing plate is any of 0°, 45° or 90°.

The adhesive used for lamination is not particularly limited, and examples thereof include PVA resins (such as modified PVA having an acetoacetyl group, sulfonic acid group, carboxyl group or oxyalkylene group) and an aqueous solution of a boron-containing compound. Among them, the PVA resins are preferred. The thickness of the adhesive layer after drying is preferably from 0.01 μm to 10 μm, and particularly preferably from 0.05 μm to 5 μm.

Examples of the laminated layer structure can include the following.

a) A/P/A
b) A/P/B
c) A/P/T
d) B/P/B
e) B/P/T

Here, reference character "A" designates a non-stretched film according to the present invention, reference character "B" designates a stretched film according to the present invention, reference character "T" designates a cellulose triacetate film (FUJI TAC), and reference character "P" designates a polarizing layer. In the case of the "a" and "b" structures, A and B may have the same or different cellulose acetate compositions. In the case of the "d" structure, B may have the same or different cellulose acetate composition, and the stretching ratios may also be the same or different. When such structures are incorporated into a liquid crystal display device for use, any may serve as the liquid crystal face. However, when using the structures "b" or "e", it is more preferable to provide B on the liquid crystal side.

When incorporating into a liquid crystal display device, while a substrate comprising the liquid crystals in between two polarizing plates is usually provided, the structures of "a" to "e" and the ordinary polarizing plate (T/P/T) may be freely incorporated. However, it is preferable to provide a transparent hard coat layer, an anti-glare layer, an anti-reflective layer and the like on the uppermost face film of the liquid crystal display device. Layers which shall be described below may be used.

The higher the light transmittance and the polarizing degree of the thus-obtained polarizing plate, the better. The light transmittance of the polarizing plate for 550 nm wavelength light is preferably in the range of from 30% to 50%, more preferably from 35% to 50%, and most preferably from 40% to 50%. The polarizing degree for 550 nm wavelength light is preferably in the range of from 90% to 100%, more preferably from 95% to 100%, and most preferably from 99% to 100%.

Further, the thus-obtained polarizing plate can be laminated to a λ/4 plate to prepare a circularly polarizing plate. In such a case, lamination is conducted so that the angle between the slow axis of the λ/4 plate and the absorption axis of the polarizing plate is 45°. The λ/4 plate is not particularly limited, but preferably has such wavelength dependence that retardation becomes smaller as the wavelength becomes shorter. Further, it is preferred to use a λ/4 plate comprising a polarizing film having an absorption axis inclined at an angle of from 20° to 70° with respect to the lengthwise direction and an optical anisotropic layer comprising a liquid crystal compound.

A protective film may be provided on one of the faces of these polarizing plates, and a separating film may be provided on the opposite face. The purpose of protective film and separating film is to protect the polarizing plates during optical plate shipment, product inspection and the like.

(ii) Providing an Optical Compensatory Layer (Preparation of an Optical Compensatory Layer)

The optical anisotropic layer serves to compensate the liquid crystal compound in the liquid crystal cells during black display of a liquid crystal display device. Such a layer is formed by forming an orienting film on a stretched or non-stretched cellulose acylate film, then further providing an optical anisotropic layer.

[Orienting Film]

An orienting film is provided on a stretched or non-stretched cellulose acylate film which has undergone the above surface treatment. The orienting film has a function of deciding the orientation direction of the liquid crystal molecules. However, if the oriented state of the liquid crystal compound is fixed after orientation of the compound, the orienting film is not always necessary because its function has been fulfilled. That is, it is possible to transfer only the optical anisotropic layer having a fixed orientation state on the orienting film onto a polarizing element to thereby prepare the polarizing plate according to the present invention.

The orienting film can be provided by, for example, a rubbing treatment of an organic compound (preferably a polymer), oblique vacuum deposition of an inorganic compound, formation of a layer having microgrooves or accumulation of an organic compound (e.g., ω-tricosanoic acid, dioctadecylmethylammonium chloride or methyl stearate) by Langmuir-Blodgett method (LB membrane). Further, there are known orienting films which generate their orienting function when a magnetic field is applied thereto or when they are irradiated with light.

The orienting film is formed preferably by rubbing treatment of a polymer. The polymer to be used for the orienting film has, in principle, a molecular structure capable of orienting liquid crystal molecules.

In the present invention, in addition to the function of orienting liquid crystal molecules, it is preferred to bind a side chain having a cross-linkable functional group (e.g., a double bond) to the main chain or to introduce a cross-linkable functional group having a function of orienting liquid crystal molecules to the side chain of the polymer.

As the polymer to be used for the orienting film, either of a polymer which itself can cause cross-linking or a polymer which can be cross-linked with a cross-linking agent can be used. It is also possible to employ a plural combinations thereof. Examples of the polymer include methacrylate copolymers described in, for example, Japanese Patent Application Laid-Open No. 8-338913, paragraph [0022], styrenic copolymers, polyolefins, polyvinyl alcohol and modified polyvinyl alcohol, poly(N-methylolacrylamide), polyesters, polyimides, vinyl acetate copolymers, carboxymethyl cellulose and polycarbonates. It is also possible to use a silane coupling agent as the polymer. Water-soluble polymers (e.g., poly(N-methylolacrylamide), carboxymethyl cellulose, gelatin, polyvinyl alcohol and modified polyvinyl alcohol) are preferred, gelatin, polyvinyl alcohol and modified polyvinyl alcohol are more preferred, and polyvinyl alcohol and modified polyvinyl alcohol are most preferred. It is particularly preferred to use two or more polyvinyl alcohols or modified polyvinyl alcohols having differing polymerization degrees in combination thereof. The saponification degree of the polyvinyl alcohol is preferably from 70% to 100%, and more preferably from 80% to 100%. The polymerization degree of the polyvinyl alcohol is preferably from 100 to 5,000.

The side chain having a function of orienting liquid crystal molecules generally has a hydrophobic group as a functional group. The specific kind of functional group is decided depending upon the kind of liquid crystal molecule and necessary orientation state. For example, a modifying group for the modified polyvinyl alcohol can be introduced by modification by copolymerization, modification by chain transfer or modification by block polymerization. Examples of the modifying group include a hydrophilic group (e.g., a carboxylic acid group, a sulfonic acid group, a phosphonic acid group, an amino group, an ammonium group, an amide group or a thiol group), a hydrocarbon group having from 10 to 100 carbon atoms, a fluorine atom-substituted hydrocarbon group, a thioether group, a polymerizable group (e.g., an unsaturated polymerizable group, an epoxy group or an aziridinyl group) or an alkoxysilyl group (e.g., trialkoxy, dialkoxy or monoalkoxy). Specific examples of these modified polyvinyl alcohol compounds include those which are described in, for example, Japanese Patent Application Laid-Open No. 2000-155216, paragraphs [0022] to [0145], and Japanese Patent Application Laid-Open No. 2002-62426, paragraphs [0018] to [0022].

The polymer of the orienting film and the multi-functional monomer contained in the optical anisotropic layer can be copolymerized with each other by either connecting a side chain having cross-linkable functional group to the main chain of the orienting film polymer or by introducing a cross-linkable functional group into the side chain having the function of orienting liquid crystal molecules. As a result, strong covalent bonds are formed with in orienting film polymer molecules and between the multi-functional monomer and the orienting film polymer as well as within multi-functional monomer molecules. Thus, the strength of the optical compensatory film can be remarkably improved by introducing a cross-linkable functional group into the orienting film polymer.

The cross-linkable functional group of the orienting film polymer preferably contains a polymerizable group, as is the case with the multi-functional monomer. Specific examples thereof include those described in, for example, Japanese Patent Application Laid-Open No. 2000-155216, paragraphs [0080] to [0100]. In addition to the above-mentioned cross-linkable functional group, the orienting film polymer can also be cross-linked using a cross-linking agent.

Examples of the cross-linking agent include aldehydes, N-methylol compounds, dioxane derivatives, compounds capable of functioning as a cross-linking agent by activating a carboxyl group, active vinyl compounds, an active halogen-containing compound, isoxazoles and a dialdehyde starch. Two or more of the cross-linking agents may be used in combination thereof. Specific examples include those compounds which are described in, for example, Japanese Patent Application Laid-Open No. 2002-62426, paragraphs [0023] and [0024]. A highly reactive aldehyde is preferred, with glutaraldehyde being particularly preferred.

The addition amount of the cross-linking agent is preferably from 0.1 to 20% by mass, and more preferably from 0.5 to 15% by mass, of the polymer. The amount of unreacted cross-linking agent remaining in the orienting film is preferably equal to or less than 1.0% by mass, and more preferably equal to or less than 0.5% by mass. Such an amount ensures sufficient durability with no reticulation even if the orienting film is used for a long time in a liquid crystal display device or left for a long period in a high-temperature and high-humidity atmosphere.

The orienting film can be formed basically by coating onto a transparent support a coating solution containing the above polymer, which is a material for forming the orienting film, and a cross-linking agent, drying under heating (to cross-link), then subjecting the coated support to rubbing treatment. As described above, the cross-linking reaction may be conducted at any stage after the coating of the coating solution onto the transparent support. In the case of using a water-soluble polymer such as polyvinyl alcohol as the orienting film-forming material, the coating solution is preferably prepared by using a mixed solvent of an organic solvent (e.g., methanol) having an anti-foaming function and water. The mixing ratio of water:methanol in terms of mass ratio is preferably 0:100 to 99:1, and more preferably from 0:100 to 91:9. With such a ratio, the generation of foam is suppressed, and defects in the orienting film and, further, defects in the surface of the optically anisotropic layer are dramatically reduced.

Preferred examples of a method for coating the orienting film include spin coating, dip coating, curtain coating, extrusion coating, rod coating or roll coating. Rod coating is particularly preferred. The thickness of the orienting film after being dried is preferably from 0.1 to 10 μm. The drying under heating can be conducted at a temperature of from 20° C. to 110° C. In order to form sufficient cross-linking, the temperature is preferably from 60° C. to 100° C., and more preferably from 80° C. to 100° C. The drying time can be from 1 min to 36 hours, and is preferably from 1 minute to 30 minutes. The pH is preferably set to an optimal level for the cross-linking agent which will be used. In the case of using glutaraldehyde, the pH is preferably from 4.5 to 5.5, and particularly preferably is 5.

The orienting film may be provided on a stretched or non-stretched cellulose acylate film or on the above undercoat layer. The orienting film can be obtained by cross-linking the polymer layer as described above, then subjecting the surface thereof to a rubbing treatment.

As the rubbing treatment, a treating method widely employed as a method for orienting the liquid crystals of an LCD can be applied. That is, a method can be employed which achieves orientation by rubbing the surface of the orienting film in a certain direction with paper, gauze, felt, rubber, nylon fibers or polyester fibers. In general, the rubbing treatment is conducted by rubbing several times using a cloth or the like uniformly implanted with fibers having a uniform length and thickness.

In the case of conducting on an industrial scale, the rubbing treatment can be conducted by bringing a film having the polarizing layer, while conveying the film, into contact with a rotating rubbing roll. The roundness, cylindricity and deflection (eccentricity) of the rubbing roll are all preferably 30 μm or less. The lapping angle of the film with respect to the rubbing roll is preferably from 0.1° to 90°. However, as is described in Japanese Patent Application Laid-Open No. 8-160430, it is also possible to perform stable rubbing treatment by winding 360° or more. The film conveying rate is preferably from 1 m/min to 100 m/min. It is preferable to select a proper rubbing angle in the range of from 0° to 60°. If using in a liquid crystal display device, the angle is preferably from 40° to 50°, with 45° being particularly preferred.

The thickness of the thus-obtained orienting film is preferably in the range of from 0.1 μm to 10 μm.

Next, the liquid crystal molecules of the optical anisotropic layer are oriented on the orienting film. Subsequently, as needed, the orienting film polymer is cross-linked by reacting the orienting film polymer with the multi-functional monomer contained in the optical anisotropic layer or by using a cross-linking agent.

The liquid crystal molecules used in the optical anisotropic layer may be rod-like liquid crystal molecules or discotic liquid crystal molecules. The rod-like liquid crystal molecules and discotic liquid crystal molecules may be high molecular liquid crystals or low molecular liquid crystals. Further, they may also be those wherein low molecular liquid crystal molecules have been cross-linked to thereby lose their liquid crystal properties.

[Rod-Like Liquid Crystal Molecules]

Preferable examples of rod-like liquid crystal molecules which can be used include azomethines, azoxy compounds, cyanobiphenyls, cyanophenylesters, benzoates, phenyl cyclohexanecarboxylates, cyanophenylcyclohexanes, cyano-substituted phenylpyridines, alkoxy-substituted phenylpyrimidines, phenyldioxanes, tolans and alkenylcyclohexylbenzonitriles.

Additionally, the rod-like liquid crystal molecules may also be metal complexes. Also, liquid crystal polymers containing a rod-like liquid crystalline molecule in repeating units thereof can be used as the rod-like liquid crystal molecules. In other words, the rod-like liquid crystal molecules may be bound to a (liquid crystal) polymer.

Descriptions regarding rod-like liquid crystal molecules are given in the quaterly Kagaku Sosetsu, vol. 22, Ekisho No Kagaku (1994), compiled by Nihon Kagakukai, chapters 4, 7 and 11, and the Ekisho Device Handbook, compiled by Nihon Gijutsu Shinkokai 142$^{nd}$ Iinkai, chapter 3.

The birefringence of the rod-like liquid crystal molecules is preferably in the range of from 0.001 to 0.7.

The rod-like liquid crystal molecules preferably have a polymerizable group in order to fix their orientation state. The polymerizable group is preferably a radical-polymerizable unsaturated group or a cation-polymerizable group. Specific examples include the polymerizable groups and polymerizable liquid crystal compounds described in, for example, Japanese Patent Application Laid-Open No. 2002-62427, paragraphs [0064] to [0086].

[Discotic Liquid Crystal Molecules]

Examples of the discotic liquid crystal molecules include the benzene derivatives described in a report by C. Destrade et al., Mol. Cryst., 71, 111 (1981); the truxene derivatives described in a report by C. Destrade et al., Mol. Cryst., 122, 141 (1985) and a report of Physics lett, A, 78, 82 (1990); the cyclohexane derivatives described in a report by B. Kohne et al., Angew. Chem., 96, 70 (1984); and the azacrown or phenylacetylene macrocycles described in a report by J. M. Lehn et al., J. Chem. Commun., p. 1794 (1985) and a report by J. Zhang et al., J. Am. Chem. Soc., 116, 2655 (1994).

Examples of the discotic liquid crystal molecules include compounds exhibiting liquid crystallinity that have a structure wherein straight-chain alkyl groups, alkoxy groups or substituted benzoyloxy groups substitute a parent nucleus in a radial pattern as side chains. Such compounds that the molecules or aggregate of the molecules have rotational symmetry and impart a certain orientation are preferable. In an optical anisotropic layer formed by the discotic liquid crystal molecules, the compound finally contained in the optical anisotropic layer does not necessarily comprise discotic liquid crystal molecules. For example, such compound may comprise low molecular discotic liquid crystal molecules having a group capable of reacting with heat or light, which undergoes a polymerization or cross-linking reaction from the heat or light to form a higher molecular weight compound that has lost its liquid crystallinity. Preferred examples of the discotic liquid crystal molecules are described in Japanese Patent Application Laid-Open No. 8-50206. A description regarding the polymerization of discotic liquid crystal molecules is given in Japanese Patent Application Laid-Open No. 8-27284.

In order to fix the discotic liquid crystal molecules by polymerization, it is necessary to bind a polymerizable group as a substituent to a discotic core of the discotic liquid crystalline molecules. Compounds wherein the discotic core and the polymerizable group are bound to each other through a linking group are preferred, since orientation state can be maintained in the polymerization reaction. Examples of such compounds are described in, for example, Japanese Patent Application Laid-Open No. 2000-155216, paragraphs [0151] to [0168].

In hybrid orientation, the angle between the longer axis of the discotic liquid crystalline molecule (discotic plane) and the plane of the polarizing film increases or decreases with an increase in the distance from the plane of the polarizing film in the depth direction of the optical anisotropic layer. The angle preferably decreases as the distance increases. Further, the change of the angle can be a continuous increase, a continuous decrease, an intermittent increase, an intermittent decrease, a change including both continuous increase and continuous decrease, or an intermittent change including an increase and a decrease. Intermittent change includes regions wherein the oblique angle does not change in the middle of the thickness direction. Even if the angle contains regions which do not change, it is acceptable as long as the angle either increases or decreases as a whole. However, it is preferred that the angle changes in a continuous manner.

The average direction of the longer axis of the discotic liquid crystal molecules on the polarizing film side can generally be adjusted by selecting the material of the discotic liquid crystal molecules or the orienting film, or by selecting the method of rubbing treatment. Further, the direction of the longer axis of the discotic liquid crystal molecules (discotic plane) on the surface side (air side) can generally be adjusted by selecting the kind of discotic liquid crystal molecule or the kind of additive to be used together with the discotic liquid crystal molecules. Examples of the additive to be used together with the discotic liquid crystal molecules include a plasticizer, a surfactant, a polymerizable monomer and a polymer. The degree of change in the orientation direction of the longer axis can similarly be adjusted by selecting the kind of liquid crystal molecule and the additive.

[Other Constituents of the Optical Anisotropic Layer]

Uniformity of a coated film, film strength and orienting properties of the liquid crystal molecules can be improved by using a plasticizer, a surfactant or a polymerizable monomer together with the above-mentioned liquid crystal molecules. As such constituents, those which have a good compatibility with the liquid crystal molecules and can impart change in the oblique angle of the liquid crystal molecules or do not inhibit orientation are preferred.

Examples of the polymerizable monomer include radical-polymerizable compounds and cation-polymerizable compounds. Preferred is a multi-functional, radical-polymerizable monomer which is copolymerizable with the polymerizable group-containing liquid crystal compound described above. Examples thereof include those described in Japanese Patent Application Laid-Open No. 2002-296423, paragraphs [0018] to [0020]. The addition amount of the compound is generally in the range of from 1% to 50% by mass, preferably from 5% to 30% by mass of the discotic liquid crystal molecules.

Examples of the surfactant can include conventionally known compounds, with fluorine-containing compounds being particularly preferred. Specific examples are described in Japanese Patent Application Laid-Open No. 2001-330725, paragraphs [0028] to [0056].

The polymer to be used together with the discotic liquid crystal molecules preferably imparts change in the oblique angle to the discotic liquid crystalline molecules.

Examples of the polymer include cellulose esters. Preferred examples of the cellulose esters are those which are described in Japanese Patent Application Laid-Open No. 2000-155216, paragraph [0178]. The addition amount of the polymer is in the range of preferably from 0.1% to 10% by mass, more preferably from 0.1% to 8% by mass of the liquid crystal molecules in order not to inhibit orientation of the liquid crystal molecules.

The temperature at which phase transition takes place between the discotic-nematic liquid crystal phase and the solid phase of the discotic liquid crystal molecules is preferably from 70° C. to 300° C., and more preferably from 70° C. to 170° C.

[Formation of the Optical Anisotropic Layer]

The optical anisotropic layer can be formed by coating on an orienting film a coating solution containing liquid crystal molecules and, as needed, a below-described polymerization initiator and an optional component.

An organic solvent is preferably used as the solvent used for preparing the coating solution. Examples of organic solvents include amides (e.g., N,N-dimethylformamide), sulfoxides (e.g., dimethylsulfoxide), hetero ring compounds (e.g., pyridine), hydrocarbons (e.g., benzene and hexane), alkylhalides (e.g., chloroform, dichloromethane and tetrachloroethane), esters (e.g., methyl acetate and butyl acetate), ketones (e.g., acetone and methyl ethyl ketone) and ethers (e.g., tetrahydrofuran and 1,2-dimethoxyethane). Preferable are alkylhalides and ketones. Two or more of the organic solvents may be used in combination thereof.

Coating of the coating solution can be conducted by a known method (e.g., wire bar coating, extrusion coating, direct gravure coating, reverse gravure coating or die coating).

The thickness of the optical anisotropic layer is preferably from 0.1 μm to 20 μm, more preferably from 0.5 μm to 15 μm, and most preferably from 1 μm to 10 μm.

[Fixing of Orientation State of the Liquid Crystal Molecules]

The oriented liquid crystal molecules can be fixed with the orientation state being maintained. Fixing is preferably conducted by means of a polymerization reaction. The polymerization reaction can be a thermal polymerization reaction using a thermal polymerization initiator and a photo polymerization reaction using a photo polymerization initiator, with the photo polymerization reaction being preferred.

Examples of the photo polymerization initiator include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), a combination of a triarylimidazole dimer and p-aminophenylketone (described in U.S. Pat. No. 3,549,367), acridine and phenazine compounds (described in Japanese Patent Application Laid-Open No. 60-105667 and U.S. Pat. No. 4,239,850) and oxadiazoles (described in U.S. Pat. No. 4,212,970).

The amount of the photo polymerization initiator to be used is preferably in the range of from 0.01% to 20% by mass, and more preferably from 0.5% to 5% by mass, of the solid component of the coating solution.

UV rays are preferably used for the light irradiation for polymerization of the liquid crystal molecules.

The irradiation energy is preferably in the range of from 20 mJ/cm² to 50 J/cm², more preferably from 20 mJ/cm² to 5,000 mJ/cm², and particularly preferably from 100 mJ/cm² to 800 mJ/cm². In order to accelerate the photo polymerization reaction, UV ray irradiation may be performed under heating conditions.

A protective layer may be provided on the optical anisotropic layer.

It is also preferred to combine this optical compensatory film with the polarizing layer. That is, an optical anisotropic layer is formed by coating a coating solution to be used for the optical anisotropic layer such as that described above onto a surface of the polarizing film. As a result, a thin polarizing plate which receives only a small stress (distortion×cross section×elasticity modulus) upon dimensional change of the polarizing film can be obtained without using a polymer film in between the polarizing film and the optical anisotropic layer. When set in a large-sized liquid crystal display device, the polarizing plate according to the present invention can display an image with a high display quality without causing problems such as light leakage.

Stretching is preferably conducted so that the oblique angle between the polarizing layer and the optical compensatory layer are the same as the angle formed between the transparent axis of the two polarizing plates laminated on both sides of a liquid crystal cell constituting the LCD and the longitudinal or transverse direction of the liquid crystal cell. The oblique angle is usually 45°. Recently, however, devices wherein the angle is not necessary 45° have been developed for transmissive, reflective and semi-transmissive LCDs. Thus, it is preferred that stretching direction can freely be selected in accordance with the design of LCD.

[Liquid Crystal Device]

The various liquid crystal modes used in such an optical compensation film will now be explained.

(TN-Mode Liquid Crystal Display Device)

TN-mode liquid crystal display devices are most often utilized as color TFT liquid crystal display devices, and are described in many publications. Regarding the orientation state in the liquid crystal cell during TN-mode black display, rod-like liquid crystal molecules are in a standing position in the central portion of the cell and in a lying position in the vicinity of the substrate of the cell.

(OCB-Mode Liquid Crystal Display Device)

The liquid crystal cell in this device is a bend orientation mode liquid crystal cell wherein rod-like liquid crystal molecules are oriented in substantially reverse directions (symmetrically) between the upper portion and the lower portion of the liquid crystal cell. A liquid crystal display device using the bend orientation mode liquid crystal cell is disclosed in U.S. Pat. Nos. 4,583,825 and 5,410,422. Since the rod-like liquid crystal molecules are symmetrically oriented between the upper portion and the lower portion of the liquid crystal cell, a bend orientation mode liquid crystal cell has a self-optical compensatory function. Thus, this liquid crystal mode is also called OCB (Optically Compensatory Bend) liquid crystal mode.

Similar to the TN-mode liquid crystal cell, the OCB-mode liquid crystal cell is in an orientation state during black display wherein rod-like liquid crystal molecules are in a standing position in the central portion of the cell and in a lying position in the vicinity of the substrate of the cell.

(VA-Mode Liquid Crystal Display Device)

VA-mode liquid crystal display devices are characterized in that the rod-like liquid crystal molecules are substantially vertically oriented when no voltage is applied thereto. VA-mode liquid crystal cells include (1) a VA-mode liquid crystal cell in the narrow sense wherein rod-like liquid crystal molecules are substantially vertically oriented while no voltage is applied thereto and substantially horizontally oriented while voltage is applied thereto (Japanese Patent Application Laid-Open No. 2-176625), (2) an MVA-mode liquid crystal cell wherein VA-mode is modified to be a multi-domain type in order to enlarge the viewing angle (SID 97, Digest of Tech. Papers, 28 (1997), 845), (3) an n-ASM-mode liquid crystal cell described in Japan Liquid Crystal Forum (1998), 58-59, in which rod-like liquid crystal molecules are substantially vertically oriented while voltage is not applied, and the molecules are substantially oriented in a twisted multi-domain alignment while voltage is applied, and (4) a liquid crystal cell of SURVAIVAL mode (published in LCD International '98).

(IPS-Mode Liquid Crystal Display Device)

IPS-mode liquid crystal display devices are characterized in that the rod-like liquid crystal molecules are oriented substantially within the plane while voltage is not applied, thereby undergoing change in orientation direction according to the application or non-application of voltage to achieve switching. Specific examples to be used are described in Japanese Patent Application Laid-Open Nos. 2004-365941, 2004-12731, 2004-215620, 2002-221726, 2002-55341 and 2003-195333.

(Other Liquid Crystal Display Devices)

Optical compensation can also be performed using the concepts described above for ECB mode, STN (Super Twisted Nematic) mode, FLC (Ferroelectric Liquid Crystal) mode, AFLC (Anti-ferroelectric Liquid Crystal) mode, and ASM (Axially Symmetric Aligned Microcell) mode. This is valid for transmissive, reflective or semi-transmissive liquid crystal display devices, and can also be effectively employed for an optical compensation sheet for a GH-type (Guest-Host) reflective liquid crystal display device.

Applications for these above-described fine cellulose derivative films are disclosed in detail at pages 45 to 59 of Hatsumei Kyokai Kokai Giho (Kogi Bango 2001-1745, published on Mar. 15, 2001, by Hatsumei Kyokai).

Providing an Anti-Reflective Layer (Anti-Reflective Film)

The anti-reflective layer generally comprises a layer having a low refractive index (low refractive index layer) which also functions as a stainproof layer and at least one layer having a refractive index higher than that of the low refractive index layer (i.e., a layer having a high refractive index or a layer having a middle refractive index), on transparent substrate.

Examples of a method for forming a multi-layer film, wherein transparent thin films consisting of inorganic compounds (e.g., metal oxides) having different refractive indexes are laminated one over the other, include chemical vacuum deposition (CVD), physical vacuum deposition (PVD) and a method of forming a thin film by forming a film of colloidal metal oxide particles through a sol/gel method using a metal compound such as a metal alkoxide, then subjecting to an after-treatment (UV irradiation: Japanese Patent Application Laid-Open No. 9-157855; plasma treatment: Japanese Patent Application Laid-Open No. 2002-327310).

On the other hand, as an anti-reflective layer whose production efficiency is high, various anti-reflective layers have been proposed which are formed by coating a coating solution for forming a thin film containing inorganic particles dispersed in a matrix.

There has also been proposed an anti-reflective film having an anti-reflective layer with glare-reducing properties imparted by forming a fine uneven pattern on the uppermost surface of the thus-coated anti-reflective layer.

The cellulose acylate film according to the present invention can be applied in any of the above methods, although the coating method (coating type) is particularly preferred.

[Layer Structure of a Coating Type Anti-Reflective Film]

An anti-reflective layer having at least a middle refractive index layer, a high refractive index layer and a low refractive index layer (outermost layer) on the cellulose acylate film is designed so that the layers have refractive indexes satisfying the following relationship: refractive index of the high refractive index layer>refractive index of the middle refractive index layer>refractive index of the transparent support>refractive index of the low refractive index layer; a hard coat layer may be provided between the transparent support and the middle refractive index layer.

Also, a structure consisting of a middle refractive index hard coat layer, a high refractive index layer and a low refractive index layer may be employed.

Examples of the above are described in Japanese Patent Application Laid-Open Nos. 8-122504, 8-110401, 10-300902, 2002-243906 and 2000-111706. Further, each of the layers may have other additional functions, such as a low refractive index layer having stainproof properties and a high refractive index layer having antistatic properties (e.g., Japanese Patent Application Laid-Open Nos. 10-206603 and 2002-243906).

The haze of the anti-reflective film is preferably 5% or less, and more preferably 3% or less. The hardness of the anti-reflective film is preferably H or more, more preferably 2H or more, and most preferably 3H or more, as measured by the pencil hardness test according to JIS K-5400.

[High Refractive Index Layer and Middle Refractive Index Layer]

The layer having a high refractive index in the anti-reflective film at least comprises a curable film containing at least super-fine particles of an inorganic compound of 100 nm or less in average particle size with a high refractive index and a matrix binder.

The inorganic compound fine particles with a high refractive index can be an inorganic compound having a refractive index of 1.65 or more, and more preferably 1.9 or more. Examples thereof include oxides of Ti, Zn, Sb, Sn, Zr, Ce, Ta, La and In, and composite oxides containing these metal atoms.

Methods to obtain the super-fine particles include treating the particle surface with a surface-treating agent (e.g., a silane coupling agent: Japanese Patent Application Laid-Open Nos. 11-295503, 11-153703 and 2000-9908; and an anionic compound or an organometallic coupling agent: Japanese Patent Application Laid-Open No. 2001-310432); forming a core-shell structure with a high refractive index particle as a core (Japanese Patent Application Laid-Open No. 2001-166104); using a specific dispersing agent in combination (Japanese Patent Application Laid-Open No. 11-153703, U.S. Pat. No. 6,210,858 B1, and Japanese Patent Application Laid-Open No. 2002-2776069) and the like.

The material for forming the matrix may be a conventionally known thermoplastic resin, curable resin film or the like.

Preferred is at least one composition selected from among compositions, and partial condensation products thereof, containing a multi-functional compound having at least two radical-polymerizable and/or cation-polymerizable groups and compositions containing an organometallic compound having a hydrolysable group. Examples include the compounds described in Japanese Patent Application Laid-Open Nos. 2000-47004, 2001-315242, 2001-31871 and 2001-296401.

Also preferred is a curable film obtained from a colloidal metal oxide obtained from a hydrolysis condensate of a metal alkoxide, and a metal alkoxide composition, as described in, for example, Japanese Patent Application Laid-Open No. 2001-293818.

The refractive index of the high refractive index layer is generally from 1.70 to 2.20. The thickness of the high refractive index layer is preferably from 5 nm to 10 μm, and more preferably from 10 nm to 1 μm.

The refractive index of the middle refractive index layer is adjusted to be a value between the refractive index of the low refractive index layer and the refractive index of the high refractive index layer. The refractive index of the middle refractive index layer is preferably from 1.50 to 1.70.

[Low Refractive Index Layer]

The low refractive index layer is in turn laminated on the high refractive index layer. The refractive index of the low refractive index layer is from 1.20 to 1.55, and preferably from 1.30 to 1.50.

The low refractive index layer is preferably constituted as an outermost layer having scratch-resistant properties and stainproof properties. As a means to remarkably improve scratch-resistant properties, it is effective to impart slipping properties to the surface. Such means can be applied by introduction of a conventionally known silicone or introduction of fluorine into the thin layer.

The refractive index of the fluorine-containing compound is preferably from 1.35 to 1.50, preferably from 1.36 to 1.47. The fluorine-containing compound is preferably a compound containing a cross-linkable or polymerizable functional group containing fluorine atoms in the range of from 35% to 80% by mass.

Examples thereof include compounds described in Japanese Patent Application Laid-Open No. 9-222503, paragraphs [0018] to [0026], Japanese Patent Application Laid-Open No. 11-38202, paragraphs [0019] to [0030], Japanese Patent Application Laid-Open No. 2001-40284, paragraphs [0027] to [0028] and Japanese Patent Application Laid-Open No. 2000-284102.

The silicone compound is preferably a compound having a polysiloxane structure, wherein a curable functional group or a polymerizable functional group is contained in the high polymer chain, and which forms a cross-linking structure in the film. Examples include reactive silicones (e.g., Silaplane, manufactured by Chisso Corporation), and polysiloxanes having silanol group at each end (Japanese Patent Application Laid-Open No. 11-258403).

The cross-linking reaction or polymerization reaction of a fluorine-containing compound and/or silicone compound having a cross-linkable or polymerizable functional group with the polymer is preferably conducted by irradiating with light or heating simultaneously with, or after, coating a coating composition for forming the outermost layer containing a polymerization initiator or a sensitizing agent.

Also preferred is a sol/gel curable film which is cured by a condensation reaction between an organometallic compound such as a silane coupling agent and a silane coupling agent having a specific fluorine-containing hydrocarbon group in the presence of a catalyst.

Examples thereof include silane compounds having a polyfluoroalkyl group or the partially hydrolyzed condensation product thereof (compounds described in, e.g., Japanese Patent Application Laid-Open Nos. 58-142958, 58-147483, 58-147484, 9-157582 and 11-106704), and silyl compounds having a fluorine-containing long chain group of poly(perfluoroalkyl ether) group (compounds described in Japanese Patent Application Laid-Open Nos. 2000-117902, 2001-48590 and 2002-53804).

The low refractive index layer can contain, as additives other than those described above, a filler (e.g., low refractive index inorganic compounds having an average primary particle size of from 1 nm to 150 nm, such as silicon dioxide (silica), fluorine-containing particles (e.g., magnesium fluoride, calcium fluoride or barium fluoride), and organic fine particles described in Japanese Patent Application Laid-Open No. 11-3820, paragraphs [0020] to [0038]), a silane coupling agent, a slip agent, a surfactant and the like.

When the low refractive index layer is positioned as an outermost layer, the low refractive index layer may be formed by a gas phase method (e.g., vacuum vapor deposition, sputtering, ion plating or plasma CVD). A coating method is preferred because of its low production costs.

The thickness of the low refractive index layer is preferably from 30 nm to 200 nm, more preferably from 50 nm to 150 nm, and most preferably from 60 nm to 120 nm.

[Hard Coat Layer]

The hard coat layer is provided on the surface of the stretched or non-stretched cellulose acylate film in order to impart physical strength to the anti-reflective film. It is particularly preferred to provide the hard coat layer between the stretched or non-stretched cellulose acylate film and the high refractive index layer. It is also preferred to conduct coating onto the stretched or non-stretched cellulose acylate film without providing an anti-reflective layer.

The hard coat layer is preferably formed by a cross-linking reaction or a polymerization reaction of a light- and/or heat-curable compound. Preferable examples of the curable functional group include a photo-polymerizable functional group, while the organometallic compound having a hydrolysable functional group is preferably an organic alkoxysilyl compound.

Specific examples of such compounds include those exemplified for the high refractive index layer.

The specific composition constituting the hard coat layer can be such as those described in, for example, Japanese Patent Application Laid-Open Nos. 2002-144913, 2000-9908 and WO 00/46617 (International Publication of PCT Application) pamphlet.

The high refractive index layer can also function as the hard coat layer. In such case, it is preferred to form the layer by incorporating fine particles in the hard coat layer in a finely dispersed state using a method described with respect to the high refractive index layer.

The hard coat layer can also function as an anti-glare layer (described below) having an anti-glare-function when particles of from 0.2 to 10 µm in average particle size are incorporated therein.

The thickness of the hard coat layer can properly be designed depending upon use. The thickness of the hard coat layer is preferably from 0.2 to 10 µm, and more preferably from 0.5 to 7 µm.

The hardness of the hard coat layer is preferably H or more, more preferably 2H or more, and most preferably 3H or more, as measured by the pencil hardness test according to JIS K-5400. Further, the abrasion loss of a test piece before and after being tested by Taber's abrasion resistance test according to JIS K-5400 is preferably as small as possible.

[Forward Scattering Layer]

The forward scattering layer is provided for the purpose of improving viewing angle when the visual angle is slanted up or down, left or right, when applied to a liquid crystal display device. The hard coat layer can also function as the forward scattering layer when fine particles having a different refractive index are dispersed in the hard coat layer.

Examples of a forward scattering layer include those having a specific forward scattering coefficient (described in Japanese Patent Application Laid-Open No. 11-38208), those wherein the relative refractive index between the transparent resin and the fine particles is adjusted to a specific range (described in Japanese Patent Application Laid-Open No. 2000-199809), and those whose haze value is specified to be 40% or more (described in Japanese Patent Application Laid-Open No. 2002-107512).

[Other Layers]

In addition to the above layers, there may be provided a primer layer, an antistatic layer, an undercoat layer and a protective layer.

[Coating Method]

Each of the layers of the anti-reflective film can be formed by coating according to a dip coating method, an air knife coating method, a curtain coating method, a roller coating method, a wire bar coating method, a gravure coating method, a micro-gravure coating method or an extrusion coating method (U.S. Pat. No. 2,681,294).

[Anti-Glare Function]

The anti-reflective film may have an anti-glare function for scattering external light. The anti-glare function can be obtained by forming uneven portions on the surface of the anti-reflective film. If the anti-reflective film has an anti-glare function, the haze of the anti-reflective film is preferably from 3% to 30%, more preferably from 5% to 20%, and most preferably from 7% to 20%.

As a method for forming uneven portions on the surface of the anti-reflective film, any method may be employed that can adequately maintain such a surface shape. Examples include forming uneven portions on a film surface by using fine particles in the low refractive index layer (e.g., Japanese Patent Application Laid-Open No. 2000-271878); adding comparatively large particles (0.05 to 2 µm in particle size) to a layer under the low refractive index layer (high refractive index layer, middle refractive index layer or hard coat layer) in a comparatively small amount (from 0.1% to 50% by mass) to form a surface-uneven film, and providing a low refractive index layer while maintaining the uneven portions (e.g., Japanese Patent Application Laid-Open Nos. 2000-281410, 2000-95893, 2001-100004 and 2001-281407); and, after providing the outermost layer (stainproof layer), physically transferring an uneven shape onto the surface (e.g. the embossing method described in Japanese Patent Application Laid-Open Nos. 63-278839, 11-183710 and 2000-275401).

[Applications]

The non-stretched or stretched cellulose acylate film according to the present invention are effective as an optical film, especially as a protective sheet for the polarizing plate, as a liquid crystal display device optical compensation sheet (also called "phase difference film"), as the optical compensation sheet of a reflective liquid crystal display device, and as a support used for a silver halide photosensitive material.

The measurement methods employed in the present invention will now be described.

(1) Elasticity Modulus

Stress when subjected to 0.5% stretching in a 23° C. and 70% rh atmosphere at a drawing rate of 10% per minute was measured to determine the elasticity modulus. Measurement was carried out for MD and TD, and the elasticity modulus was taken as the average value thereof.

(2) Substitution Degree of Cellulose Acylate

The substitution degree of each acyl group in the cellulose acylate, as well as the substitution degree of the six position, were determined by $^{13}$C-NMR according to the method disclosed in Carbohydr. Res. 273 (1995) 83-91 (Tezuka et al.).

(3) Remaining Solvent

A solution was prepared in which 300 mg of a sample film was dissolved in 30 ml of methyl acetate (Sample A). Another solution was prepared in which 300 mg of a sample film was dissolved in 30 ml of dichloromethane (Sample B).

These solutions were measured by gas chromatography (GC) under the following conditions.

Column: DB-WAX (0.25 mmφ×30 m, 0.25 μm thickness).
Column temperature: 50° C.
Carrier gas: nitrogen
Analysis time: 15 minutes
Sample injection amount: 1 μml The solvent amount was determined in the following manner.

Content ratios were determined using the calibration curve for each of the peaks in Sample A, except for that of the solvent (methyl acetate), and the aggregate was taken as Sa.

In Sample B, the content ratio for each of the peaks in the region hidden by the solvent peak in Sample A was determined using calibration curves, and the aggregate was taken as Sb.

The sum of Sa and Sb was taken as the remaining solvent amount.

(4) Heat Loss Ratio at 220° C.,

The heat loss ratio was determined by taking the weight change of 10 mg of a test sample at 220° C. when heating the sample under nitrogen from room temperature to 400° C. at a heating rate of 10° C. per minute using a TG-DTA 2000S manufactured by MAC Science Co., Ltd.

(5) Melt Viscosity

Measurement was carried out under the following conditions using a viscoelasticity measuring instrument (e.g. the modular compact rheometer "Physica MCR301" manufactured by Anton Paar Ltd.) which utilizes a cone-plate.

After sufficiently drying the resin so that water content was no greater than 0.1%, measurement was carried out with a gap of 500 μm at a temperature of 220° C. and a shearing rate of 1 per second.

(6) Re, Rth

Ten points were sampled at equidistant intervals in a width direction of the film. After subjecting the film to wetting for 4 weeks at 25° C. and 60% rh, the in-plane retardation value (Re) and retardation value (Rth) in the film-thickness direction were calculated at 25° C. and 60% rh by measuring the phase difference value for a wavelength of 590 nm from a direction slanted in 10° increments from +50° to −50° from the film normal line with the perpendicular direction with respect to the sample film surface and the slow axis serving as the rotation axes using an automatic birefringence analyzer ("KOBRA-21ADH", manufactured by Oji Scientific Instruments).

Characteristics of the present invention will now be specifically described in detail with reference to the below Examples and Comparative Examples. However, the materials, usage amounts, ratios, treatment particulars, treatment procedure and the like, illustrated in the examples may be changed as appropriate as long as such changes do not depart from the spirit of the present invention. Accordingly, the scope of the present invention should not be construed as being limited by the below-illustrated specific examples.

EXAMPLES

1. Production of Cellulose Acylate Film (1) Preparation of Cellulose Acylate

The cellulose acylates listed in Table 4 were charged with sulfuric acid as a catalyst (7.8 parts by weight to 100 parts by weight of cellulose). The resulting solutions were charged with a carboxylic acid, which serves as the raw material for the acyl substituent groups, and an acylation reaction took place at 40° C. At this point, the kind and/or substitution degree of the acyl groups was controlled by the kind and/or amount of the carboxylic acid. After acylation, a ripening was performed at 40° C., whereby samples having different polymerization degrees (the polymerization degree is lowered by lengthening the ripening time) were prepared. The polymerization degree of the thus-obtained cellulose acylates was determined in the following manner.

(Method for Measuring Polymerization Degree)

About 0.2 g of absolutely dried cellulose acylate was carefully weighed out, and dissolved in 100 ml of a mixed solvent consisting of methylene chloride and ethanol in a 9 to 1 ratio (by mass). Measurement was carried out by dropping the resulting solution for a few seconds at 25° C. using an Ostwald viscometer, whereby the polymerization degree was determined according to the following equation.

$\eta rel = T/T0$  T: Number of seconds that the sample being measured is dropped $[\eta] = (1 n \eta rel)/C\ T0$: Number of seconds of solvent only being dropped $DP = [\eta]/Km$  C: concentration (g/l)

Km: $6 \times 10^{-4}$ (2) Cellulose Acylate Pelletization

The above cellulose acylate, and a plasticizer, stabilizer and optical modifier selected from those listed below, were dried for 3 hours at 100° C., so that moisture content was no more than 0.1% by weight. All the levels were further charged with 0.05% by weight of silicon dioxide microparticles (Aerosil R972V) and an ultraviolet absorber (0.05% by weight of 2-(2'-hydroxy-3',5-di-t-butylphenyl)-benzotriazole and 0.1% by weight of 2,4-hydroxy-4-methoxy-benzophenone).

(1) Plasticizer
Plasticizer A: Polyethylene glycol (molecular weight of 600)
Plasticizer B: Glycerin diacetate oleate
Plasticizer C: Glycerin tetracaprylate
Plasticizer D: Glycerin diacetate laurate
Plasticizer E: Compounds in Example B of JP-T-6-501040
Plasticizer F: Ethylphthalylethyl glycolate
(2) Stabilizer
i) Phosphites
Stabilizer A: bis(2,6-di-t-butyl-4-methylphenyl)pentaerythritol diphosphite Stabilizer B: bis(2,4-di-t-butylphenyl)pentaerythritol diphosphite
ii) Phosphite ester compounds
Stabilizer C: tris(2,4-di-t-butylphenyl)phosphite
Stabilizer D: 2,2-methylenebis(4,6-di-t-butylphenyl)octylphosphite
iii) Others
Stabilizer E: Citric acid
(3) Optical Modifier Chemical Formula 13

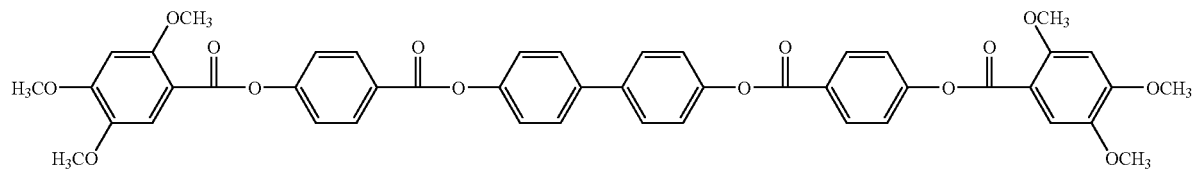

Using a twin screw kneader-extruder provided with an evacuator, these substances were extruded from a die at a screw revolution speed of 300 rpm, a kneading time of 40 seconds and an extrusion rate of 200 kg/hr. The extruded material was solidified in 60° C. water, and then cut into column-shaped pellets having a 2 mm diameter and a 3 mm length.

(3) Melt Film Forming

The thus-prepared cellulose acylate pellets were dried at 100° C. for 5 hours using a dehumidifying airstream with a −40° C. dew-point temperature, so that moisture content was no more than 0.01% by weight. The dried pellets were charged into an 80° C. hopper, and the melt-extruder and die temperatures were adjusted. The diameter of the screw employed at this stage was 60 mm (outlet side); L/D was 50 and the compression ratio was 4. On the screw inlet side, the pellets were cooled by oil circulating inside the screw having a Tg 5° C. below that of the pellets. The holding time of the resin in the barrel was 5 minutes. The barrel was designed so that the hottest temperature and the lowest temperature in the barrel were respectively located at the outlet and the inlet. The resin extruded from the extruder was conveyed at a fixed quantitative amount using a gear pump, although at this stage the extruder revolution speed was varied in order to control the resin pressure upstream of the gear pump at a fixed pressure of 10 MPa. The molten resin conveyed from the gear pump was filtered using a 5 μm filtration accuracy leaf disc filter, and then passed through a static mixer and extruded from a coat hanger die having 0.8 mm slit intervals. The extruded mixture was solidified on a casting drum. At this time, using a method which applied static electricity to each level (a 10 kV wire provided at a position 10 cm from the point at which the molten mixture landed onto the casting drum), static electricity was applied to positions 10 cm from each side. The solidified molten mixture was stripped off from the casting drum, and immediately before taking up, trimmed on both sides (5% on each side over the entire width) and knurled on both sides with a width of 10 mm and a height of 50 μm. The resulting product was then being taken up at a rate of 30 m/min to a length of 3,000 m. Each of the thus-obtained non-stretched films had a width of 1.5 m and a thickness as shown in Table 1 of FIG. 4.

(4) Evaluation of the Melt-Produced Films (Non-Stretched)

The thus-obtained cellulose acylate films were measured in the manner described above. The Tg of the films was measured according to the method described below, and the results are shown in Table 1.

(Tg Measurement)

A 20 mg sample was placed on the measuring pan of a DSC. The temperature of this sample was raised from 30° C. to 250° C. at 10° C. per minute in a nitrogen atmosphere (first run), and then cooled to 30° C. at 10° C. per minute. The temperature was then again raised from 30° C. to 250° C. (second run). The glass transition temperature (Tg) shown in Table 4 was taken as the temperature at which the base line in the second run began to inflect from the low temperature side. All the levels were further charged with 0.05% by weight of silicon dioxide microparticles (Aerosil R972V).

The quality of the non-stretched cellulose acylate films for Examples 1 to 10 and Comparative Examples 1 and 2 produced under the film production conditions given in the FIG. 4 table were evaluated. The quality evaluation of the non-stretched cellulose acylate films concerned Re and the rate of charge (distribution) thereof, haze, YI value, film thickness, and stretch elongation at break. Measurement of elongation at break was conducted in the following manner. Using a heating-means-equipped stretching apparatus "Strograph" manufactured by Toyo Seiki Seisaku-Sho, Ltd., a film sample was heated for 1 minute in an oven at Tg +10° C. The elongation at break until the sample fractured (stretching difference between post-stretching and pre-stretching) was then measured at a chuck distance of 100 mm and a drawing rate of 100 mm/minute.

In the table of FIG. 4, Examples 1 to 5 and Comparative Examples 1 and 2 are cases where the temperature of the molten resin at the die outlet during production of the cellulose acylate film (non-stretched) is varied. Further, Examples 6 and 7 are cases where the extrusion temperature (extruder outlet resin temperature) is varied; Examples 8 is a case where the distance from the die outlet to the cooling drum is varied; and Examples 9 and 10 are cases where the lip clearance of the die is varied.

In Comparative Example 1, the temperature of the die outlet molten resin at the die outlet is 68° C. higher than the Tg, which is a lower temperature than that of the Examples. As a result, the retardation Re increases (exceeding 80 nm), as does the haze value (which exceeds 2.0%). Since Re is manifested having a large value, the stretch value at the stretching step cannot be increased. In Comparative Example 2, the temperature of the molten resin at the die outlet is increased to 160° C. higher than the Tg, whereby not only does retardation Re drop to below −10 nm, but the YI value increases to 13. On the other hand, the temperature of the molten resin at the die outlet in Examples 1 to 5 is respectively +90° C., +120° C., +90° C., +135° C., +105° C. and +100° C., whereby the non-stretched cellulose acylate film Re and distribution thereof, haze, YI value, film thickness and elongation at break were all good. Accordingly, it was learned that it is preferable to control the temperature of the molten resin at the die outlet in the range of Tg +70° C. to Tg +150° C. Conversely, it was learned that a preferable non-stretched cellulose acylate film can be produced by controlling the temperature of the molten resin at the die outlet so that retardation Re is in the range of −10 to 80 nm.

As shown in Example 6, if the temperature of the molten resin at the extruder outlet drops below 190° C., the haze value is slightly higher (1.8%) than that in Examples 1 to 5. As shown in Example 7, if the temperature of the molten resin at the extruder outlet exceeds 240° C., the YI value is slightly higher (9) than that in Examples 1 to 5. Accordingly, it was learned that the temperature of the molten resin at the extruder outlet is preferably in the range of from 190 to 240° C.

In Example 8, the distance from the die outlet to the cooling support exceeded 200 mm, whereby retardation Re was 80 nm, which was higher than in the case where the distance was 50 mm. Accordingly, it was learned that the distance from where the molten resin is discharged from the die outlet until the molten resin reaches the cooling support is preferably 200 mm or less.

In Examples 9 and 10 the lip clearance ratio (D/W), represented by die lip clearance (D) with respect to thickness (W) of the molten resin extruded from the die, was set to 1.5 and 10. Good results were obtained if D/W was in the range of from 1.5 to 10.

(5) Preparation of a Polarizing Plate

Under the film production conditions of Example 4 (considered to be the best mode) in Table 1 of FIG. 4, non-stretched films having differing film materials (substitution degree, polymerization degree and plasticizer) were produced as described in Table 2 of FIG. 5, to thereby produce the below polarizing plates.

(5-1) Saponification of Cellulose Acetate Film

Non-stretched cellulose acylate films underwent saponification according to the below-described dip saponification method. Similar results were obtained with the coat saponification below.

(i) Coat Saponification 20 parts by mass of water was added to 80 parts by mass of isopropyl alcohol, and KOH was dissolved therein so that its concentration became 2.5 mol/L. This solution was adjusted to a temperature of 60° C. to use as a saponifying solution.

This solution was coated on a 60° C. cellulose acylate film in an amount of 10 g/m², and saponification was conducted for one minute. Then, 50° C. warm water was sprayed thereover for 1 minute in an amount of 10 L/m² per minute to conduct washing.

(ii) Dip Saponification

A 2.5 mol/L aqueous solution of NaOH was used as a saponifying solution.

This solution was adjusted to a temperature of 60° C., and the cellulose acylate film was dipped therein for 2 minutes.

Thereafter, the film was dipped in a 0.1 N aqueous solution of sulfuric acid for 30 seconds, and passed through a water-washing bath.

(5-2) Preparation of a Polarizing Layer

The film was stretched in a lengthwise direction by applying a difference in peripheral speed between two pairs of nip rolls according to Example 1 in Japanese Patent Application Laid-Open No. 2001-141926, whereby a 20 μm thick polarizing layer was prepared.

(5-3) Lamination

The thus-obtained polarizing layer and the saponification-treated non-stretched and stretched cellulose acylate film, and saponification-treated FUJI TAC (non-stretched triacetate film) were laminated so that the stretching direction and the polarizing film production flow direction (lengthwise direction) of the cellulose acylate film were formed in the below combinations, using a 3% aqueous solution of PVA (PVA-117H; manufactured by Kuraray CO., LTD.) as an adhesive.

Polarizing plate A: non-stretched cellulose acylate film/polarizing layer//FUJI TAC Polarizing plate B: non-stretched cellulose acylate film/polarizing layer/non-stretched cellulose acylate film (5-4) Polarizing Plate Color Tone Variation The magnitude of color tone variation for the thus-obtained polarizing plates was evaluated over 10 levels (the higher the level the greater the color tone variation). The polarizing plates produced in accordance with the present invention all received a good evaluation.

(5-5) Moist Curl Evaluation

Thus-obtained polarizing plates were measured in the same manner as described above. Even after undergoing the polarizing plate processing, good characteristics (i.e. low curl) were exhibited by the objects produced in accordance with the present invention.

Plates were also formed by laminating so that the polarizing axis and the lengthwise direction of the cellulose acylate film were orthogonal and 45° from each other, and then evaluated in the same manner. These plates all showed the same results as in the above parallel lamination.

(6) Production of an Optical Compensatory Layer and a Liquid Crystal Display Device The observer side polarizing plate provided on a 22 inch liquid crystal display device (manufactured by Sharp Corporation) employing a VA type liquid crystal cell was peeled off, and in its place above-described phase difference polarizing plates A, B, which had their polarizing plate removed, were stuck to the observer side via an adhesive so that the cellulose acylate film was on the liquid crystal cell side. A liquid crystal display device was then produced such that the transmission axis of the polarizing plate on the observer side was orthogonal to the transmission axis of the polarizing plate on the backlight side.

There was little deviance in the lamination, because the lamination was easy to conduct with small curl when carried out in accordance with the present invention.

It was also possible to prepare a good optical compensatory film with little moist curl even when using the cellulose acylate film according to the present invention in place of the cellulose acylate film coated with the liquid crystal layer of Example 1 in Japanese Patent Application Laid-Open No. 11-316378.

It was also possible to prepare a good optical compensatory film with little moist curl even if an optical compensatory filter film having the cellulose acylate film according to the present invention in place of the cellulose acylate film coated with the liquid crystal layer of Example 1 in Japanese Patent Application Laid-Open No. 7-333433.

Further, a good liquid crystal display device with little moist curl could be obtained when the polarizing plate and phase difference polarizing plate of the present invention were employed in the liquid crystal display device described in Example 1 of Japanese Patent Application Laid-Open No. 10-48420, the orienting film coated with polyvinyl alcohol and an optical anisotropic layer containing discotic liquid crystal molecules described in Example 1 of Japanese Patent Application Laid-Open No. 9-26572, the 20-inch VA-type liquid crystal display device described in FIGS. 2 to 9 of Japanese Patent Application Laid-Open No. 2000-154261, the 20-inch OCB-type liquid crystal display device described in FIGS. 10 to 15 of Japanese Patent Application Laid-Open No. 2000-154261, and the IPS-type liquid crystal display device described in FIG. 11 of Japanese Patent Application Laid-Open No. 2004-12731.

(7) Preparation of an Anti-Reflective Film

An anti-reflective film was prepared using the cellulose acylate film of the present invention according to Example 47 of Hatsumei Kyokai Kokai Giho (Kogi Bango 2001-1745). The moist curl of this film was measured in the same manner as described above. The same good results as those achieved for the polarizing plate were also attained when an anti-reflective film was employed in accordance with the present invention.

Further, evaluation showed that a good liquid crystal display device was obtained when the anti-reflective film of the present invention was laminated on the outermost layer of the liquid crystal display device of Example 1 of Japanese Patent Application Laid-Open No. 10-48420, the 20-inch VA-type liquid crystal display device described in FIGS. 2 to 9 of Japanese Patent Application Laid-Open No. 2000-154261, the 20-inch OCB-type liquid crystal display device described in FIGS. 10 to 15 of Japanese Patent Application Laid-Open No. 2000-154261 and evaluated, and the IPS-type liquid crystal display device described in FIG. 11 of Japanese Patent Application Laid-Open No. 2004-12731.

What is claimed is:

1. A method for producing a cellulose acylate film by melt film formation, including discharging a molten cellulose acylate resin melted in an extruder on a running or rotating cooling support through a die in a form of a sheet, thereby solidifying the discharged molten resin by cooling, the method comprising:

measuring an in-plane a retardation (Re) of a slow axis which is a lengthwise direction of the cellulose acylate film and a retardation (Rth) of the cellulose acylate film in thickness direction; and controlling the temperature of the molten resin at an outlet of the die to a range of glass transition temperature Tg+70° C. to Tg+150° C. so that the measured retardations Re and Rth fall into the range of −10 nm to 80 nm and 0 to 60 nm, respectively; and controlling a lip clearance ratio (D/W), which is a ratio of a lip clearance (D) of the die to a thickness (W) of the molten resin extruded through the die, to a range of 1.5 to 10, wherein the extruder employs conditions of a screw compression ratio of 2.5 to 4.5, an L/D (the ratio of cylinder length (L) to cylinder bore diameter (D) of the extruder) of 20 to 70, and a temperature of the molten resin at an outlet of the extruder of 190° C. to 245° C.

2. The method for producing a cellulose acylate film according to claim 1, wherein a distance for the molten resin discharged through the outlet of the die to land on the cooling support ranges from 5 mm to 200 mm.

3. A method for producing a stretched cellulose acylate film, comprising stretching a cellulose acylate film produced according to claim 1 in at least a lengthwise direction and a transverse direction of the film by 1% to 300%.

4. A method for producing a stretched cellulose acylate film, comprising stretching a cellulose acylate film produced according to claim 2 in at least a lengthwise direction and a transverse direction of the film by 1% to 300%.

5. The method for producing a cellulose acylate film according to claim 1, wherein the cellulose acylate film has an elongation at break of 50% or more when the film is uniaxially stretched at the glass transition temperature Tg+10° C.

6. The method for producing a cellulose acylate film according to claim 1, wherein the cellulose acylate has an average polymerization degree of 100 to 300.

* * * * *